(12) United States Patent
Wang

(10) Patent No.: US 10,788,699 B2
(45) Date of Patent: Sep. 29, 2020

(54) SWITCHABLE PROJECTION PANEL

(71) Applicant: Jiansheng Wang, Plano, TX (US)

(72) Inventor: Jiansheng Wang, Plano, TX (US)

( * ) Notice: Subject to any disclaimer, the term of this patent is extended or adjusted under 35 U.S.C. 154(b) by 0 days.

(21) Appl. No.: 15/908,399

(22) Filed: Feb. 28, 2018

(65) Prior Publication Data

US 2018/0188561 A1    Jul. 5, 2018

Related U.S. Application Data

(62) Division of application No. 14/204,642, filed on Mar. 11, 2014, now Pat. No. 9,921,425.

(51) Int. Cl.
*G02F 1/1334* (2006.01)
*G02F 1/1339* (2006.01)
*G03B 21/60* (2014.01)

(52) U.S. Cl.
CPC .......... *G02F 1/1334* (2013.01); *G02F 1/1339* (2013.01); *G02F 1/13392* (2013.01); *G03B 21/60* (2013.01)

(58) Field of Classification Search
CPC ............... G02F 1/1334; G02F 1/13342; G02F 2001/13345
See application file for complete search history.

(56) References Cited

U.S. PATENT DOCUMENTS

2014/0078410 A1 * 3/2014 Wang ..................... G03B 21/16
349/5
2015/0275090 A1 * 10/2015 Wang ................... C09K 19/544
252/299.01

* cited by examiner

*Primary Examiner* — Phu Vu

(57) ABSTRACT

A panel apparatus comprises a first layer. The first layer includes a liquid crystal microdroplet display (LCMD) switchable between transparent and opaque states in response to a change in an applied electrical voltage. The panel apparatus further comprises a second layer spaced apart from and coupled to the first layer. The second layer includes a transparent panel.

14 Claims, 16 Drawing Sheets

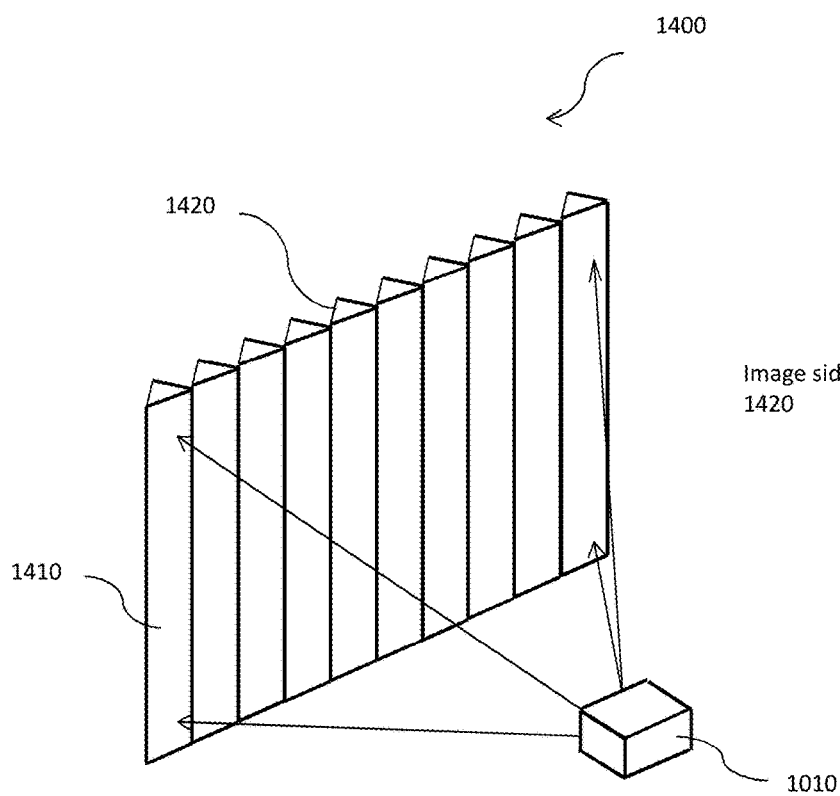
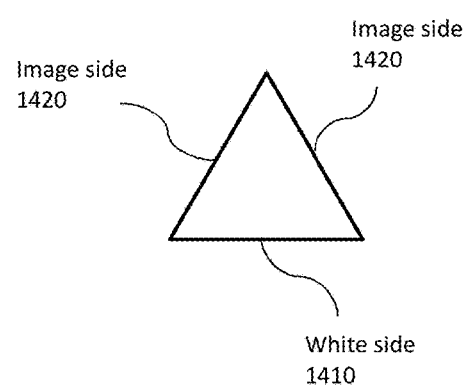
Fig. 14b
Fig. 14a

SWITCHABLE PROJECTION PANEL

CROSS-REFERENCE TO RELATED APPLICATIONS

This application is a divisional of U.S. patent application Ser. No. 14/204,642, filed Mar. 11, 2014, the contents of which are incorporated herein by reference.

FIELD

The present disclosure is directed toward layered panel systems and methods of use, and more particularly to systems and methods for projection panels using liquid crystal microdroplet (LCMD) devices.

BACKGROUND

Continued advancements in the field of optoelectronics have led to the development of liquid crystal microdroplet (LCMD) displays. In this type of display, liquid crystal (LC) material is contained in microdroplets embedded in a solid polymer matrix. Birefringence results from a material having a different index of refraction in different directions. The extraordinary index of refraction ($n_e$) of a liquid crystal molecule is defined as that measured along the long axis of the molecule, and the ordinary index of refraction ($n_o$) is measured in a plane perpendicular to the long axis. The dielectric anisotropy of liquid crystals is defined as $\Delta\varepsilon=\varepsilon_\parallel-\varepsilon_\perp$, where $\varepsilon_\parallel$ and $\varepsilon_\perp$, are parallel and perpendicular dielectric constants, respectively. Liquid crystals having a positive dielectric anisotropy ($\Delta\varepsilon>0$) are called positive-type liquid crystals, or positive liquid crystals, and liquid crystals having a negative dielectric anisotropy ($\Delta\varepsilon<0$) are called negative-type liquid crystals, or negative liquid crystals. The positive liquid crystals orient in the direction of an electric field, whereas the negative liquid crystals orient perpendicular to an electric field. These electro-optical properties of liquid crystals have been widely used in various applications.

One approach to obtaining dispersed microdroplets in a polymer matrix is the method of encapsulating or emulsifying the liquid crystals and suspending the liquid crystals in a film which is polymerized. This approach is described, for example, in U.S. Pat. Nos. 4,435,047; 4,605,284; and 4,707,080. This process includes mixing positive liquid crystals and encapsulating material, in which the liquid crystals are insoluble, and permitting formation of discrete capsules containing the liquid crystals. The emulsion is cast on a substrate, which is precoated with a transparent electrode, such as an indium tin oxide (ITO) coating, to form an encapsulated liquid crystal device.

LCMD displays may also be formed by phase separation of low-molecular weight liquid crystals from a prepolymer or polymer solution to form microdroplets of liquid crystals. This process, described in U.S. Pat. Nos. 4,685,771 and 4,688,900, includes dissolving positive liquid crystals in an uncured resin and then sandwiching the mixture between two substrates which are precoated with transparent electrodes. The resin is then cured so that microdroplets of liquid crystals are formed and uniformly dispersed in the cured resin to form a polymer dispersed liquid crystal device. When an AC voltage is applied between the two transparent electrodes, the positive liquid crystals in microdroplets are oriented and the display is transparent if the refractive index of the polymer matrix ($n_p$) is made to equal the ordinary index of liquid crystals ($n_o$). The display scatters light in the absence of the electric field, because the directors (vector in the direction of the long axis of the molecules) of the liquid crystals are random and the refractive index of the polymer cannot match the index of the liquid crystals. Nematic liquid crystals having a positive dielectric anisotropy ($\Delta\varepsilon>0$), large $\Delta n$, which may contain a dichroic dye mixture, can be used to form a transparent and absorbing mode.

LCMD displays may be characterized as normal mode or reverse mode displays. A normal mode display containing liquid crystals is non-transparent (scattering or absorbing) in the absence of an electric field and is transparent in the presence of an applied electric field. A reverse mode display is transparent in the absence of an electric field and is non-transparent (scattering or absorbing) in the presence of an applied electric field.

If an electric field is applied on a LCMD display, liquid crystals in microdroplets are not entirely perpendicular to the substrate. The central part of liquid crystals in the droplets is clear if the refractive index of the polymer matches the ordinary refractive index of the liquid crystals ($n_o$). However, liquid crystals near the ends of the microdroplet are strongly bent because they are parallel to the skin of the inner layer. They are, therefore, tilted to the substrate surface, and the refractive index of the liquid crystals cannot match with the refractive indexes of the polymer matrix and inner layer. Therefore, parts of the liquid crystal droplets scatter light and produce haze.

There exists a need for devices that use improved LCMD technologies in projection systems that provide improved diffusion and provide for a wide viewing angle. These functions may be achieved with an improved scattering mechanism using, for example, a non-linear optical matrix system.

SUMMARY

The embodiments of the invention are summarized by the claims that follow the description.

In one embodiment, a panel apparatus comprises a first layer. The first layer includes a liquid crystal microdroplet (LCMD) display switchable between transparent and opaque states in response to a change in an applied electrical voltage. The panel apparatus further comprises a second layer spaced apart from and coupled to the first layer. The second layer includes a transparent panel.

In another embodiment, a film apparatus comprises a first layer. The first layer includes a liquid crystal microdroplet (LCMD) display switchable between transparent and opaque states in response to a change in an applied electrical voltage. The film apparatus also includes a second layer coupled to the first layer. The second layer includes a light reflective coating.

Additional aspects, features, and advantages of the present disclosure will become apparent from the following detailed description.

BRIEF DESCRIPTION OF THE DRAWINGS

The present disclosure is best understood from the following detailed description when read with accompanying figures. It is emphasized that, in accordance with the standard practice in the industry, various features are not drawn to scale and are used for illustration purpose only. In fact, the dimension of the various features may be arbitrarily increased or reduced for clarity of discussion.

FIG. 11b is a perspective view of the switchable projection billboard of FIG. 11a.

FIG. 12b is a perspective view of the switchable projection billboard of FIG. 12a.

FIG. 14a is a perspective view of a projection triangular prism changeable billboard according to one or more embodiments of the present disclosure.

FIG. 14b is a cross-sectional view of a prism element of the projection changeable billboard of FIG. 14a.

DETAILED DESCRIPTION

Figure 1:
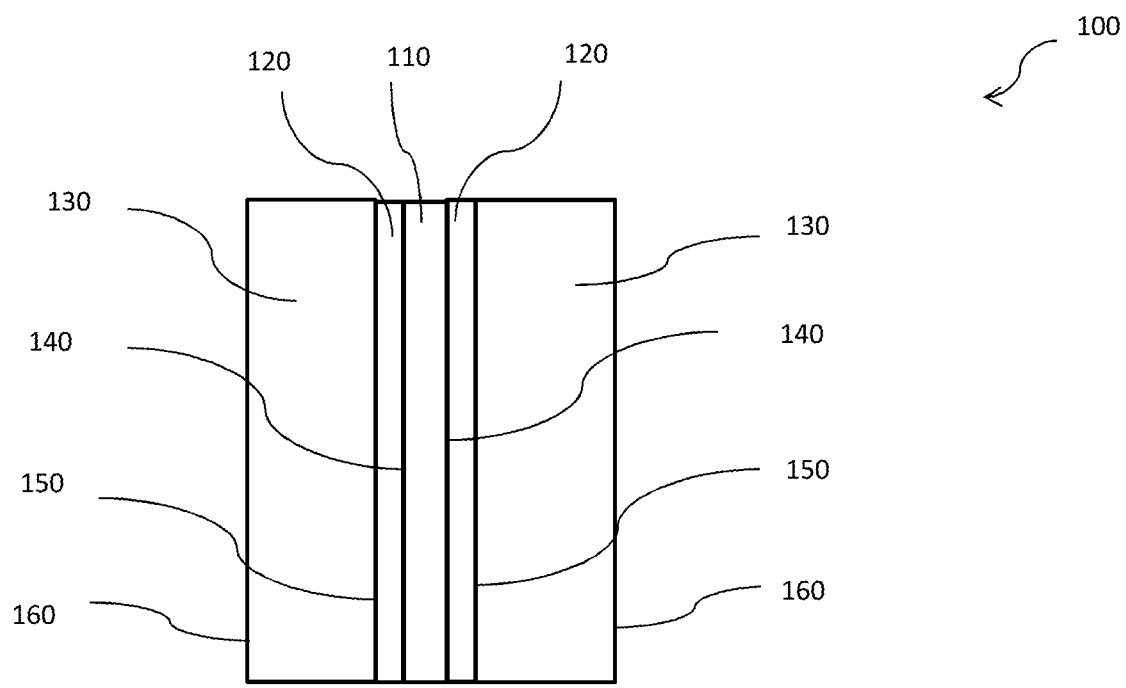
FIG. 1 is a cross-sectional view of an LCMD film structure according to an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein the term "LCMD device" or "LCMD film" or "LCMD display" means a device or film or display, respectively, formed using various classes of polymer films. For example, an LCMD device may be formed using nematic curvilinear aligned phase (NCAP) films, such as material and devices described in U.S. Pat. No. 4,435,047, filed Sep. 16, 1981 disclosing "Encapsulated Liquid Crystal and Method," which is incorporated by reference herein in its entirety. An LCMD device may also be formed using polymer dispersed liquid crystal (PDLC) films formed using phase separation in a homogenous polymer matrix, such as material and devices described in U.S. Pat. No. 4,688,900 filed Sep. 17, 1985 disclosing "Light Modulating Material Comprising a Liquid Crystal Dispersion in a Plastic Matrix," which is incorporated by reference herein in its entirety. An LCMD device may also be formed using a non-homogenous polymer dispersed liquid crystal display (NPD-LCD) formed using a non-homogenous light transmissive copolymer matrix with dispersed droplets of liquid crystal material, such as material and devices described in U.S. Pat. No. 5,270,843 filed Aug. 31, 1992 disclosing "Directly Formed Polymer Dispersed Liquid Crystal Light Shutter Displays," which is incorporated by reference herein in its entirety. Other forms of liquid crystal microdroplet films may also be suitable. A NPD-LCD device may be configured in one of two modes. In a positive mode, an NPD-LCD device is switchable between an opaque state without an applied electrical voltage and clear state with an applied electrical voltage. In a negative mode, an NPD-LCD device is switchable between a clear state without an applied electrical voltage and an opaque state with an applied electrical voltage.

As used herein, the terms "switchable projection panel," "layered switchable panel," or "layered projection panel" means a device or panel component formed of at least one layer of a transparent material such as glass or a polymer material together with at least one LCMD film layer. As used herein, the term "glass" is understood to include traditional silica-based glass as well as polymer-based transparent materials, such as acrylic glass and polycarbonate, that have a relatively rigid planar format. Glass may be colored or include tinting. Glass may also include reinforced, toughened and laminated glasses or any other type of transparent glass having higher strength, safety or other special features.

Referring to FIG. 1, a cross-sectional view of one example of an LCMD film structure 100 is illustrated. LCMD film structure 100 includes a LC-polymer (matrix) layer 110, a transparent and conductive coating 120 (e.g., an indium tin oxide (ITO) coating) and a transparent plastic film 130. There are three layer interfaces. An interface 140 between LC-polymer matrix 110 and ITO 120 and an interface 150 between ITO 120 and film 130 are solid-solid interfaces. A film surface 160 is air-solid interface. Note that in alternative embodiments, the film surface may have a liquid-solid interface (e.g., if the structure is submerged in a liquid) or another gas-solid interface. A light passing through a liquid-solid interface behaves similarly to light passing through a solid-solid interface because the reflective indexes are similar. Gas has a smaller reflective index than liquids or solids.

Figure 2:
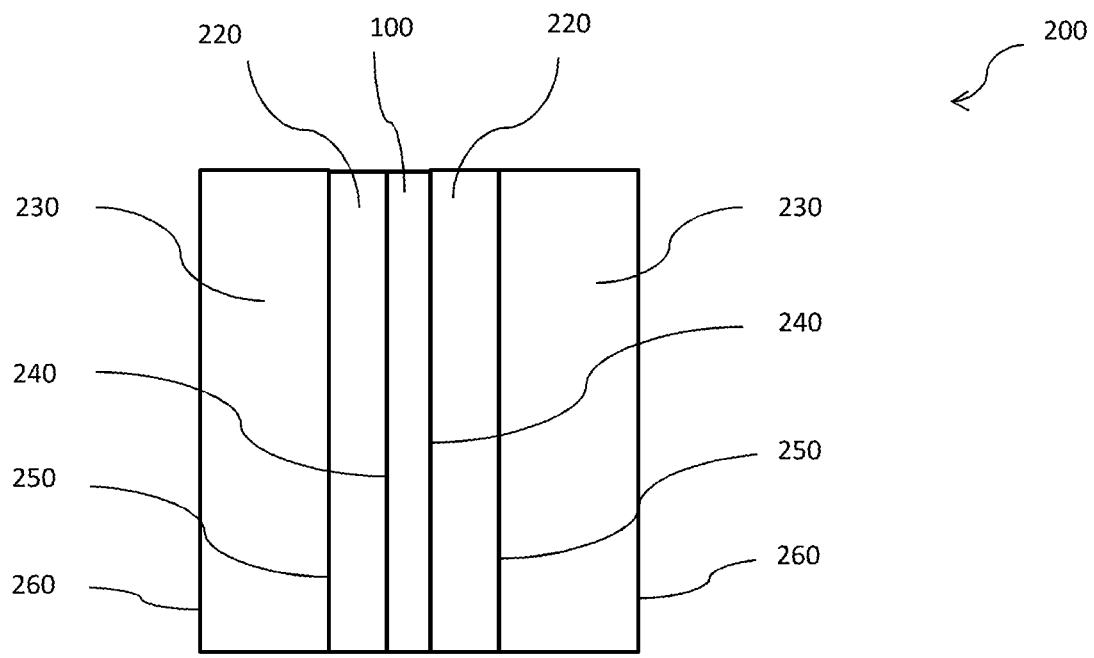
FIG. 2 is a cross-sectional view of a laminated LCMD panel according to an embodiment of the present disclosure.

FIG. 2 is a cross-sectional view of a laminated LCMD panel 200. The LCMD film structure 100 is laminated between two layers of glass 230 with an adhesive interlayer 220. The interlayer material may include, for example, polyvinyl butyral (PVB), ethylene vinyl acetate (EVA), and/or thermoplastic polyurethane (TPU). An interface 240 between LCMD film structure 100 and the interlayer 220 and an interface 250 between the interlayer 220 and the glass 230 are solid-solid interfaces. A glass surface 260 is air-solid interface. Note that in alternative embodiments, the glass surface may have a liquid-solid interface (e.g., if the structure is submerged in a liquid) or another gas-solid interface. As used herein, the term "laminated" refers to layered structures in which the LCMD film and one or more layers of glass are separated by an adhesive interlayer extending across substantially the entire interface between the LCMD film and the glass.

Figure 3:
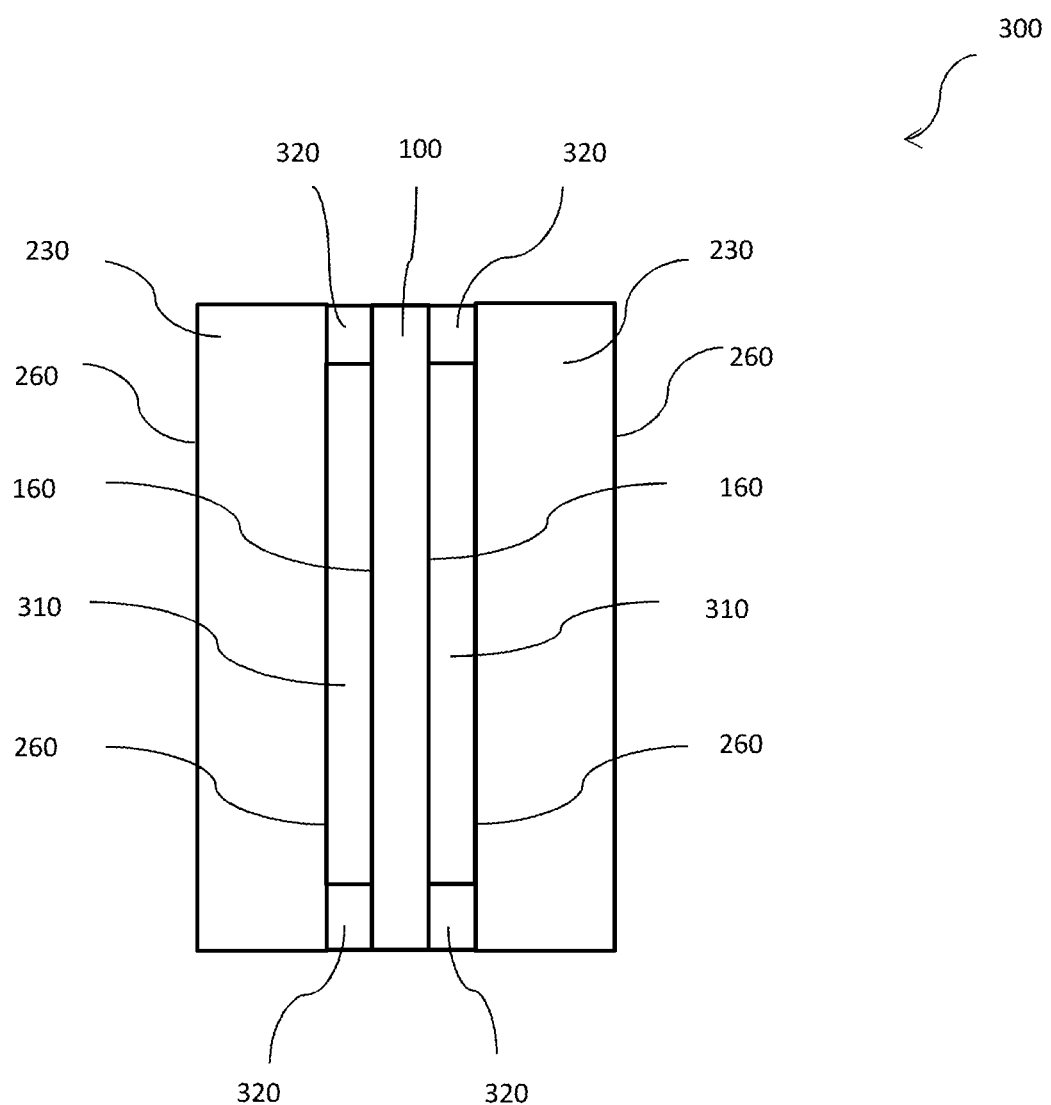
FIG. 3 is a cross-sectional view of a panel apparatus according to one or more embodiments of the present disclosure.

FIG. 3 is a cross-sectional view of a panel apparatus 300. The apparatus 300 includes the layered LCMD film 100 positioned between two layers of glass 230. A seal 320 extends around a perimeter between the glass 230 and the LCMD film 100. The seals 320 trap or sandwich an air layer 310 between the LCMD film 100 and the glass 230. Thus, interface 260 between the glass and the air layer 310 is solid-air interface, and the interface 160 between the LCMD film and the air layer 310 is a solid-air interface. However, other configurations and inclusion or omission of the apparatus 300 may be possible. The terms "sandwiching" and "air-sandwiching" are understood to include creating a gap for or trapping air or another fluid (with optical properties similar to air) between the glass and the LCMD film. For example, the use of an inert gas, such as argon gas, as a trapped gaseous material may allow the panel to resist heat and thus provide energy savings. In various alternative embodiments, an air-tight seal is not required between the LCMD film 100 and the glass 230. Rather, any form of spacing component that produces a gap and provides a bond between the LCMD film 100 and the glass 230 may be used. In this embodiment, air-flow through the gap permitted.

The panel apparatus 300 is an example embodiment and is not intended to limit the present invention beyond what is explicitly recited in the claims. For example in various embodiments, spacers 610 (See, e.g., FIG. 6) may be added into air layer 310 to provide a flatness or rigidity to the panel. The perimeter size of the LCMD film 100 may be smaller than the perimeter size of the glass 230, so that the edge seal may cover the edge of the LCMD film 100 to enhance bonding between the two layers of glass.

The edge seal 320 may have sufficient strength and rigidity to maintain the film and glass in a spaced-apart relationship as the panel apparatus 300 is transported, for example, by way of a suction cup tool attached to one of the two layers of glass. Suitable edge seal materials may include extreme adhesion tapes, liquid adhesives, or gelatinous adhesives. The adhesive may be applied with patterning delivery system. After assembling the apparatus 300, the adhesive or other sealant material may be cured with various of methods such as by using heat, UV, catalyst or additional time. Either or both of the film 100 and the glass layers 230 may also have anti-reflective coating or anti-glare coatings.

Light energy traveling through the air-solid interface 160 in apparatus 300 behaves differently from light energy traveling through the solid-solid interface 240 in apparatus 200. These interfaces have important optical function and greatly affect image quality of projection.

The laminated LCMD glass panel 200 is much more durable than LCMD film. Although laminated LCMD glass panels have been used as switchable privacy glass for many years, they are unsuitable for image projection, because projected images on laminated LCMD glass panels may appear very blurry. Older generations of LCMD films, such as NCAP and PDLC films, are not suitable for projection because the projected images are not bright and clear enough on such films. Low level of scattering and serious asymmetrical scattering (oval effect) render these types of LCMD films unsuitable for projection. Poor stability of the older generation of LCMD film is another reason that these types of older LCMD films are unsuitable for projection. First generation LCMD film, i.e. NCAP film, is made of a water soluble polymer such as polyvinyl alcohol with constant reflective index and is very hydroscopic. NCAP film must be laminated (i.e., with a full interlayer) onto glass to prevent moisture for its main application as switchable privacy glass. Second generation LCMD films, i.e., PDLC films, are made of a regular polymer such as epoxy and have a constant reflective index are also sensitive to moisture because of unbalanced chemical ratios caused by matching reflective index between liquid crystal and the polymer. Therefore, older generations of LCMD films have been mainly used in the form of laminated glass for many years. These issues with image quality and stability have prevented the adoption of laminated LCMD film panels for use in projection.

Third generation LCMD films, NPD-LCD films are made of non-linear polymer with gradually changed reflective index, are very stable in air, are water proof, and provide a high quality projection image. Many applications of NPD-LCD film do not require lamination for moisture protection. However, laminated NPD-LCD glass panels also generate blurred images and are not entirely suitable for projection. Image quality on laminated LCMD glass panels is generally inferior to image quality on corresponding LCMD film alone for front projection or rear projection. Front projection is an arrangement in which a light projector and a viewer are located on the same side of a projection screen, and rear projection is an arrangement in which a light projector and a viewer are located on opposite sides of projection screen. A projector may use laser beams as light sources. Although it is a well-known phenomenon that laminated glass panels with any type of LCMD films are unsuitable for projection, the reasons are not clearly understood.

To improve image quality, an understanding of the factors contributing to image degradation is needed. There is a strong need for the use of a rigid product incorporating LCMD film for projection because rigid forms of material, such as a glass panel, have much better durability for impact and resistance to scratches from daily activity. Glass panel apparatuses incorporating LCMD films are a better fit for many applications and protect the LCMD film for a longer timeframe. Due to lack of understanding of the causes of poor image quality, the development of a single apparatus that provides both a switchable privacy glass function and a projection screen function has been hampered. The apparatus 300 combines the advantages of durability, easy to use, well-protected formation with the advantages of projection screen functionality and switchable privacy function.

When evaluating optical systems, the greater the difference between refractive indexes at an interface, the stronger the refraction and reflection will be. Referencing apparatus 200, since refractive indexes of ITO coating 120, interlayer 220 and glass 230 are very close, the solid-solid interfaces 240, 250 do not have much effect on refraction and reflection. Therefore, interface 240 and 250 can be reasonably considered as transparent or non-existent in the following discussion and in practical use. A major reflection occurs on air-solid interface, because there is a large difference in refractive indexes.

Optical properties are dependent on material structure. In FIG. 2, after lamination, the exposed surface of LCMD film 100 (i.e., an air-solid interface) is covered by interlayer 220 and glass 230, the air-solid interface is replaced with the solid-solid interface 240. Since an air-solid interface has a superior optical function for projection, eliminating the air-solid interface 160 may cause many changes in optics properties. Comparing the apparatus 200 and the apparatus 300, overall the structures may have similar components, but for apparatus 200, the two interlayers 220 are replaced with two air layers 310 and sealant material 320 for maintaining the air layer to create the apparatus 300. Comparing the film 100 and the apparatus 200, the distance between scattering LC-polymer layer 110 to first air-solid interface 160 in film 100 is much shorter than the distance between scattering LC-polymer layer 110 (within LCMD film structure 100) to first air-solid interface 260 in apparatus 200. This distance is also contributes to projected image quality.

Figure 4:
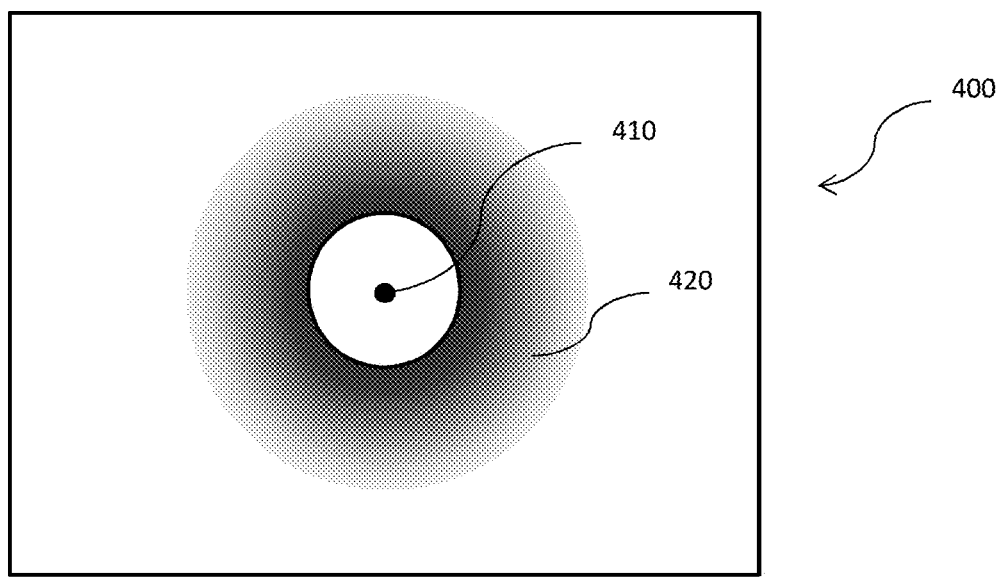
FIG. 4 is a view of a light pattern of a generated by a single point light source on the laminated LCMD panel of FIG. 2.

The present disclosure provides an explanation for the generation of poor projected image quality in laminated LCMD panels and provides embodiments that minimize or eliminate such image quality issues. As shown in FIG. 4, in order to clearly explain an optical mechanism associated with a projected image that appears blurred to a viewer, an experiment was conducted in a darkened room using a laser beam aimed at a point 410 on a laminated NPD-LCD glass panel 400 (e.g., such as apparatus 200). An observed laser light pattern 420 was generated on the laminated NPD-LCD glass. What we see from the front view (viewer is on the incident side) is: a shining spot at a center point 410 and a light pattern 420 in the form of a bright ring around the center point starting with a sharp shining edge and gradually turning to dark (note: darkness is represented by the faded outer portion of the ring in FIG. 4). This experiment simplifies a projection situation by showing that, for laminated NPD-LCD glass, the desirable input light signal is only generated at a center point with the undesirable shining ring generated around the center point. A good projection screen will only display input information at a receiving position, and any relocated light signal will act as a disturbing signal. Since the shining ring is not input light, it therefore acts as a disturbing signal.

Figure 5:
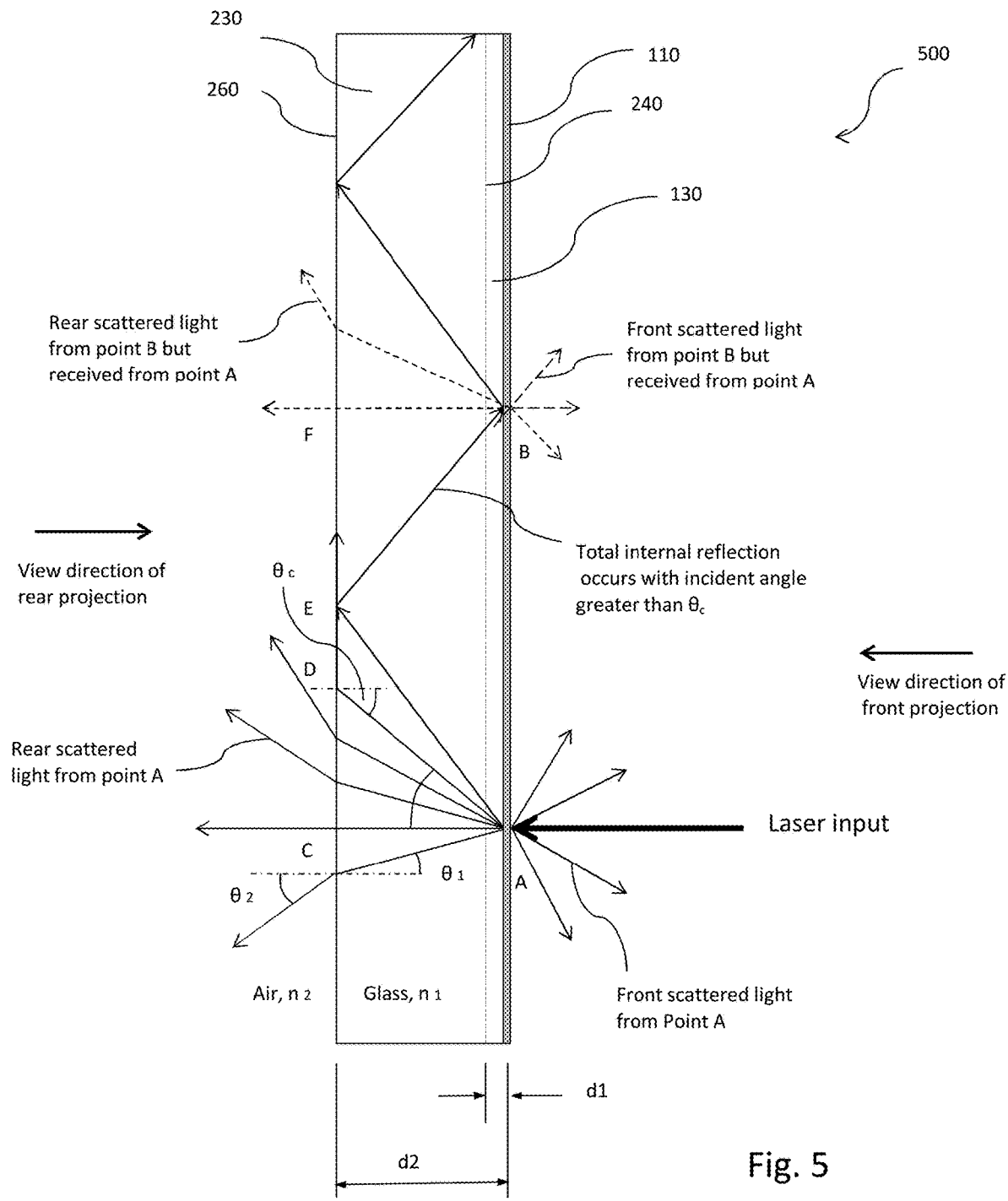
FIG. 5 is an optical illustration of scattering and total internal reflection occurring in the laminated LCMD panel of FIG. 2.

A mechanism of for generating blurry images and a detail explanation of this experiment are illustrated in FIG. 5. In order to reduce the amount of unnecessary information shown in the drawing and discussed in the following paragraphs, only one half of a laminated NPD-LCD glass panel (e.g., apparatus 200) is illustrated. This situation is very similar to a case of putting a NPD-LCD film on a glass with glue. In FIG. 5, the LC-polymer layer 110, the transparent plastic film 130, and the glass panel 230 are shown. A dashed line represents the interface 240 between film 130 and interlayer 220. Interlayer 220 and ITO layer 120 are not shown because these layers have almost no optical function in this analysis. The thickness of the film 130 is $d_1$ and the total thickness of LCMD film, interlayer, and glass is $d_2$.

In this embodiment, the LCMD film is an NPD-LCD film. When a laser beam points at a point A on the spherical scattering material of NPD-LCD matrix 110, approximately 50% of input energy is scattered back to the incident (right) side, as shown with solid arrows. This portion of light is called front scattered light. Another 50% of the light enters into glass 230 at point A. The scattered light from point A with a small angle referencing normal line to glass surface 260 may exit from glass 230 with refraction (bent angle), shown with solid arrow on left side of glass surface 260. Refraction obeys Snell's Law: $n_1/n_2 = \sin\theta_2/\sin\theta_1$. Applying Snell's Law in this situation, $n_1$ is refractive index of glass ($n_1 = 1.52$) and $n_2$ is refractive index of air ($n_2 = 1$). When $\theta_2$ is equal to 90 degree, $\theta_1$ becomes critical angle $\theta_c$ (41.1°). When the incident angle to the glass surface 260 is smaller than 41 degrees, the scattered light escapes from glass surface 260, and this portion of light is called rear scattered light. However, when incident angle on glass surface 260 is greater than critical angle $\theta_c$ (41°), the scattered light completely reflects back to inside of the glass layer 230. This phenomenon is known as total internal reflection. Total internal reflection reflects the scattered light back to LC-polymer matrix layer 110 at other locations such as point B. Point B will do a secondary spherical scattering like point A and generate front scattered light and rear scattered light shown with dashed line arrows. However, the source of the scattered light from point B is coming from point A through the total internal reflection at point E. In this way, point B delivers light information which belongs to point A. Therefore, such relocated light signal acts like an interference signal or noise generating unwanted blur. In FIG. 4, there is a dark area (dark in the laser experiment, white in drawing) between center spot 410 and shining ring 420. The inner diameter of shining ring 420 corresponds to the critical angle $\theta_c$ and the thickness of the glass 230. The incident light at points on surface 260 with smaller incident angles $\theta_c$ may escape from the glass 230 and total internal reflection creates an interference signal at a limited diameter about point A. The area between the incident point A and the ring generated by total internal reflection is free of noise, showing dark. However, in real image projection, such as video projection, no such dark area exists because the entire projection area is receiving input signals, and any point may be an area receiving total internal reflection from other points. The noise signal at point B keeps bouncing within the structure for more total internal reflections. After each bounce, light reaches to LC-polymer matrix 110, and then most reflection energy is lost to scattering. The noise signal is attenuated with its spreading. Therefore, the shining ring 420 gradually turns dark at its outer edge.

This laser test may provide more information about optical properties of laminated NPD-LCD glass. It not only qualitatively explains how blur is generated, but also may quantitatively provide a level of blur. Quantitative information may be used to guide developed applications. In order to quantitatively calculate different portions of lights, an equation of spherical crown is used, because NPD-LCD has spherical scattering and the surface of spherical crown may be used to represent rear scattered energy. Rear scattered energy is represented by $E_{rs}$. Two letters are used to represent a distance between the two points, for example, CD represents a distance from point C to point D and AD represents a distance from point A to point D. Therefore, $E_{rs} = \pi[CD^2 + (AD - AC)^2]$. Calculated data in this experiment is listed in Table 1.

TABLE 1

| Lights | Light Energy (%) |
|---|---|
| Total input energy at point A | 100 |
| Front scattered light at point A | 50 |
| Light entering into glass from point A | 50 |
| Rear scattered light $E_{rs}$ from point A | 12 |
| Total internal reflection energy from point A | 38 |
| Noise distributed in front side as first ring | 19 |
| Noise distributed in rear side as first ring | 5 |

The following discussion explains how the data was obtained and what the data means in optical properties. First, when a laser beam is pointed perpendicularly at point A on a panel with NPD-LCD film and glass, 50% of input light is scattered back to incident (right) side. The other 50% of light enters into the glass. Referencing the normal line to glass surface 260, rear scatted light from glass surface 260 is 25% of light entering into glass or 12.5% [=25%×50%] of total input light. Total internal reflection is 37.5% [=50%−12.5%] of total input and becomes noise. Second, this near 38% of interference energy is not equally distributed in both sides of the glass, and actually distributes 19% [=38%×50%] of this portion scattered on the right side as blur and ¼ or 5% [=38%×50%×¼] of interference energy pass through the glass surface 260 as blur on the left side. To simplify the discussion, this calculation ignores third and higher classes of bouncing. Third, a blurry level can be determined by noise energy. As front projection, viewing from the right side has 19% of blur. This energy is distributed on the outside of the ring with a center at point A. It is important to note that there is no noise signal on the inside of the ring from the front view. This explains why the ring illustrated in FIG. 4 has a sharp inner edge. For rear projection or viewing from the left side, noise energy is 5% and distributed around a ring with a radius of CF. Since the noise energy (19%) of the front view is four times greater than the noise energy (5%) of the rear view, this explains why the front view has poor image quality. This conclusion matches the viewer's experience; with the information on glass thickness, an inner diameter of the laser shining ring 420 can be used to find out the reflective index of glass. Using the same principle, other information, such as scattering capability, symmetry of scattering light, or coefficient of oval effect, etc. on LCMD film may be obtained from similar testing.

A further question for consideration is why 3G Switchable Film, i.e., NPD-LCD film, has excellent image quality on film alone, but poor quality on laminated NPD-LCD glass. The discussion above may apply not only to laminated LCMD glass, but to LCMD film as well. It should be noted that there are significant differences in thicknesses between the laminated glass and the film. In FIG. 5, $d_1$ is film thickness and $d_2$ is glass thickness (including film and interlayer). Greater thickness requires the first total internal reflection light to cross a larger distance. A smaller thickness limits first total internal reflection to a small range. When the original light information of point A shifts to point B through total internal reflection, there is a high likelihood that unwanted information will be brought to point B. This relocated light information from point A to point B will interfere with the original light information received at point B directly from projection. The larger the distance is between the two points A, B, the greater the chances there are to disturb the original light information. Here, original light information means light received directly from a projection, and relocated light information means light not received directly from a projection. When relocated distance (between point A and B) is reduced, the original information between these two points will get closer and closer because these two points are converging onto one point. In a real-world scenario, film thickness $d_1$ may be approximately 0.13 mm and an approximate glass thickness $d_2$ is ¼ inch. There is a 49 times difference in thickness, and, therefore, the images on the NPD-LCD film are much clearer than the images on the laminated NPD-LCD glass.

The above analysis reveals the importance of an air-solid interface 160 at the film surface to image quality. If this air-solid interface is maintained, the quality of projected images on the NPD-LCD film may be preserved. Apparatus 300 has utilized this important discovery in order to maintain good image quality for projected images. Any glue or adhesive used between LCMD film and glass layers will have the same function as an interlayer in laminated LCMD glass. Such glue or adhesive makes an air-solid interface of film 100 disappear and increases the distance from LC-polymer layer 110 to first air-solid interface, which negatively affects projected image quality. Besides the described benefits for projection, air-sandwiched switchable glass apparatus 300 has many advantages in comparison to laminated LCMD glass.

The manufacture of an air-sandwiched LCMD glass like apparatus 300 has significant advantages in energy consumption as compared to the manufacture of laminated LCMD glass like apparatus 200, because the manufacturing process for apparatus 300 may be conducted at room temperature, whereas the lamination process must be conducted at high temperature. The lamination process also requires the use of large, bulky equipment such as an autoclave or a vacuum oven. Additionally, avoiding high temperature manufacturing processes helps prolong the lifetime of LCMD film.

The materials used to form apparatus 300 may also be preferable to the materials used to form apparatus 200. The apparatus 300 avoids the use of an expensive interlayer and vacuum air bag, reducing materials costs. Omitting the interlayer of apparatus 200 also eliminates the optical distortion associated with the interlayer.

The process for creating the apparatus 300 may also be much easier and simpler than the lamination process used to create apparatus 200. Lamination has special requirements regarding the thickness of glass. The uniformity of heating and pressure required for lamination requires the use of glass that is neither too thick nor too thin. The air sandwiching process used to form apparatus 300 permits greater variations in the thickness of glass, including paper-thin glass. Commercially available super thin (0.55 mm) glass even makes the air sandwiching process as simple as the common assembly of prefabricated furniture kits. For example, in various embodiments, a layer of LCMD film may be adhered to existing glass (e.g., in a window or glass door). To form the apparatus 300, a layer of super thin glass may be applied to the LCMD film with spacers (including e.g., tape) separating the layer of super thin glass from the LCMD film.

Comparing production efficiency, the air sandwiching process used to form apparatus 300 may have much higher efficiency. A lamination process uses an autoclave and needs to induce a vacuum for several hours in order to remove air from an air bag containing five layers of different materials like LCMD film, interlayer, and glass. It is difficult to remove air between the interlayer and glass, and any contamination of air will cause defects on the final laminated glass with shining air bubbles. In order to save energy and time, a lamination process with an autoclave needs to accumulate many semi-finished products in the autoclave and then start the heating process together. In order to maintain temperature uniformity for the materials in the autoclave, a slow heating process is required. In order to avoid glass breakage, a slow cooling process is also required. Lamination with a vacuum oven has similar inefficiencies, except no additional pressure is applied on the air bag. These requirements result in an inefficient overall lamination process, usually requiring an entire day to finish one process cycle. The new air-sandwiched structure of apparatus 300 simplifies the production process and may greatly increase efficiency. Since an uncured interlayer and positive mode of LCMD film are non-transparent or translucent, aligning several layers of the translucent materials in the right position requires significant skill and time. Air-sandwiching one layer of LCMD film between two pieces of clear glass may be a simpler process. Processes to make air-sandwiched projection glass as in apparatus 300 may be easily completed in less than one hour. It is well suited for production with an automatic production line. Since an air-sandwiching process does not need specialized equipment and material, it may be as simple as common assembly of pre-fabricated furniture. Production for air-sandwiched switchable glass can be conducted not only in mass production, but also by a single person or at customer job sites. On the other hand, preventing delamination is important to the production of laminated LCMD glass because any delaminated area is bright. Uneven bottom edges of two pieces of glass may contribute to delamination because of shearing force generated between two pieces of glass. Delamination may occur on any layer of a LC-polymer matrix, between a film and an interlayer, or between an interlayer and a pane of glass. Often the use of suction cups to move laminated LCMD glass is discouraged due to the delamination potential. These risks do not exist for an air-sandwiched structure. It is generally safe to use suction cup movement in the production of apparatus 300. Therefore, production and installation yields are higher.

The costs associated with producing and using the apparatus 300 are, therefore, reduced compared to apparatus 200, with energy savings, less material usage, simple equipment needs, simple processes, and high efficiency. The production of air-sandwiched projection glass may cut two thirds of the costs as compared with the production of laminated LCMD glass. Apparatus 300 not only combines advantages of privacy, projection and durability, but also greatly reduces cost by utilizing a simpler process and requiring less materials as well as labor. Such new structures and new features may have many new applications.

Switchable projection panels (SPP) such as apparatus 300 add a projection function over prior laminated LCMD glass. The apparatus 300 may provide a cost reduction as compared to laminated LCMD glass, but greatly increases the value and enlarges the applications of the product. SPP may have a variety of applications, such as a building window, light diffusion applications, energy saving applications, privacy applications, dry erase boards, and projection screen functions. SPP may be used in homes, offices, classrooms and hospitals, stores, malls, airports and companies for various purposes like entertainment, advertising, education and work.

For some applications of SPP, such as glass curtain walls (in some glass buildings, window(s) and wall(s) may be fused into one device, referred to as a "glass curtain wall") for a building or projection advertising wall or for entire building advertising (utilizing the outer faces of an entire building as advertising), safety may be a concern. All types of architectural safety glasses, including reinforced, toughened, and laminated glasses, may be used as glass 230. Glass 230 may be in more durable forms such as laminated glass, tempered glass, hurricane proof glass or bulletproof glass to enhance strength and safety. Any transparent panel with special features such as safety, double-layered or self-cleaning may be used as glass 230, as long as the air layers 310 in the basic structure of SPP 300 are maintained. More specifically, laminated glass may be formed with two or more layers of silica-based glass or a combination of silica-based glass and polymer-based panel. Bulletproof glass is one kind of laminated glass with strength capable of blocking a bullet. Laminated glass may be formed by interlayer with autoclave or vacuum oven processes, or by resin with UV, catalyst, or thermo curing processes. Although these methods may provide high strength like bulletproof glass, resin process has much lower cost. Day light curable resin, DayLightCure, may have the lowest cost, because it utilizes nature light to cure resin without the need for special curing equipment. SPP with enhanced glass 230 is safe when used as a glass wall of a building.

Figure 6:
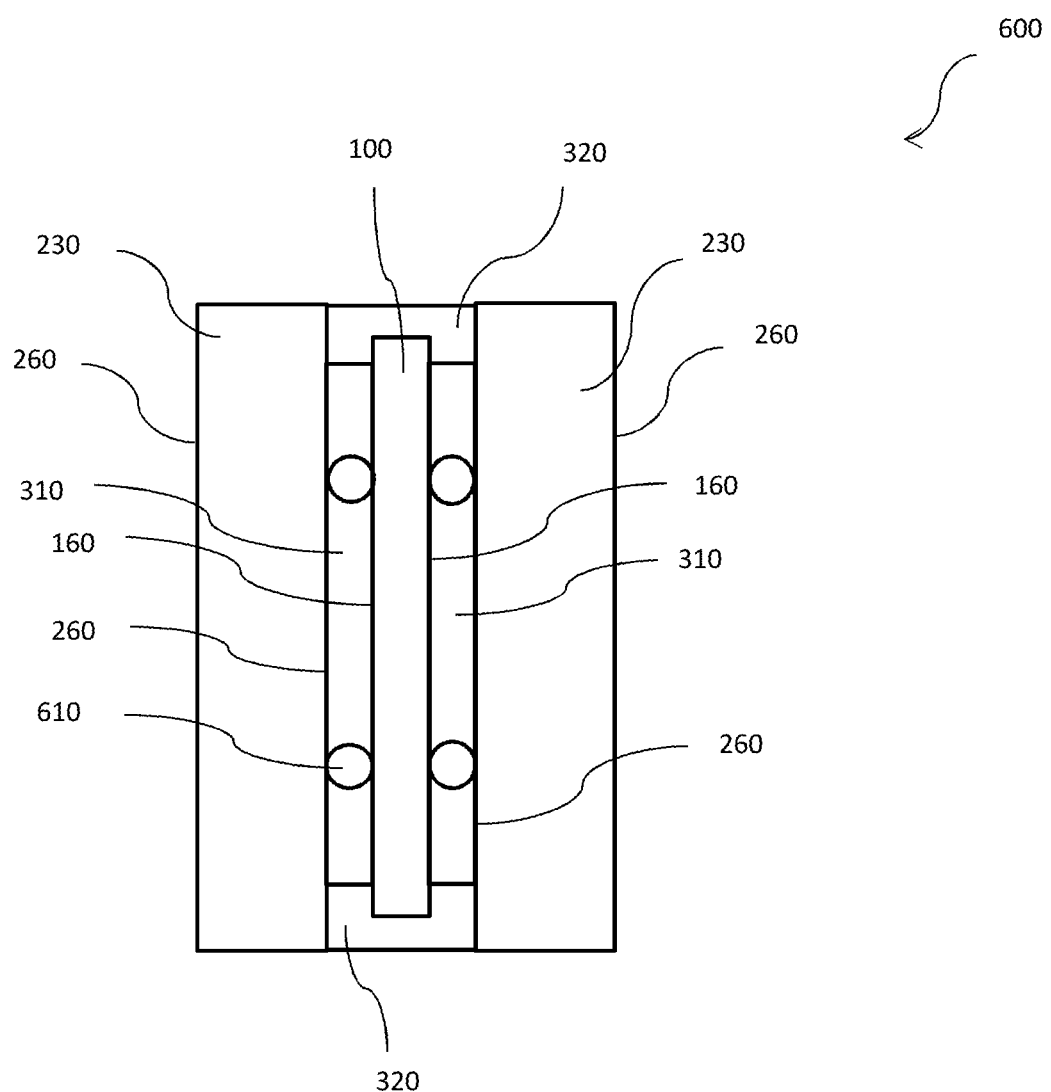
FIG. 6 is a cross-sectional view of a switchable projection panel with spacers according to an embodiment of the present disclosure.

FIG. 6 illustrates a cross-sectional view of a switchable projection panel 600 with micro-spacers 610 placed within an air layer 310 between LCMD film 100 and glass 230. Some effectively invisible micro spacers 610, having for example a diameter of 10-50 micrometers, can be sprayed, printed, or otherwise deposited between film 100 and glass 230. The spacers 610 may be ball shape, cylinder shape or other shapes. An edge seal 320 may cover the edge of LCMD film 100. In this embodiment, which has a similar structure to apparatus 300, air-sandwiched switchable glass can be used for storefront advertising glass. Sometimes, moisture and large temperature changes can make the film and glass surfaces stick together to produce rainbows. The use of the spacers 610 may prevent the occurrence of rainbows and provide high quality projection capability.

Figure 7:
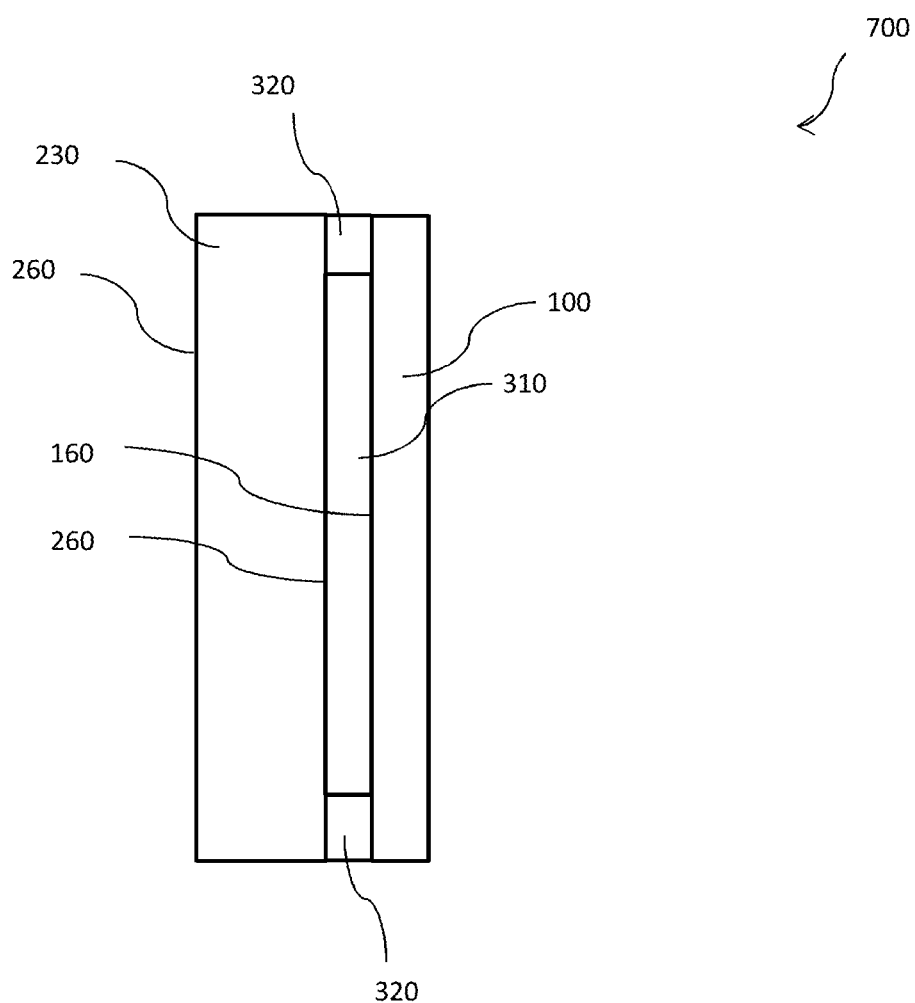
FIG. 7 is a cross-sectional view of a switchable projection panel with a single layer of glass according to one or more embodiments of the present disclosure.

Referencing FIG. 7, in some applications in which preventing scratches may not be important or necessary, a second layer of glass may be omitted. Thus, an LCMD glass panel 700 includes the LCMD film 100 exposed to air on one side and exposed to an air layer 310 on an opposite side. Opposite the LCMD film 100, the air layer 310 is bounded by the glass pane 230. Seals 320 provide separation, creating an air layer 310 between the glass 230 and the film 100. The seals 320 may provide an air-tight seal; however an air-tight seal is not always necessary. LCMD film 100 may be coupled to existing glass with double sided tape at the edges as seals 320. Seals 320 may serve to create an air gap and bond the glass and LCMD film. For example, only two opposite openings of the air layer may be sealed while the other two opposite openings of the air layer may be open. In some alternative embodiments, spacers 610 may be used within the air layer 310.

In various embodiments, including the embodiments shown in FIGS. 3 and 6, two layers of glass may be the same thickness or one may be thicker than another. When very thin glass, such as 0.55 mm thickness, is used, the manufacture process can be conducted in a factory as well as at a job site or a home using a simple assembly process. NPD-LCD film can be installed on existing glass with double-sized tape or other adhesives or tapes at the edges. Many tapes with a strong adhesion are commercially available. Various adhesion materials and technologies can be used for bonding sandwiched structures. The methods include patterning glue delivery and screen printing and curing by heat, UV, catalyst or moisture.

Television, video and motion pictures are more powerful for delivering information than still pictures or letters. In particular, large format video images are exceptional for advertising. However, displays capable of showing large format video images are very limited in use for both indoor and outdoor applications. Although a light emitting diode (LED) display is one type of display, an LED display is usually very expensive and consumes a large amount of energy. Energy consumption of full color LED displays may be around 1 kw per square meter. Since LED displays have low screen density/resolution, they may be unsuitable for close viewing. Compared with LED images, projection images have much higher image quality (e.g., are able to easily achieve high density HD images) and much higher gray scales or colors (up to billions) than images on LED displays. Projected images on switchable projection glass are suitable for both close viewing and long distance viewing. SPP projection systems have very low cost (e.g., about 10% of LED cost) and very low energy consumption (e.g., about 1% of LED energy consumption). However, projection techniques are usually is not suitable for use under bright ambient light. One reason is that projection screens with high contrast usually have lower light output, efficiency, or screen gain because the materials used in projection screens absorb a considerable portion of projected light. Theoretically, if a projection screen material delivers and outputs all received light, the screen should appear much brighter. The air-sandwiched embodiments of this disclosure (e.g. FIGS. 3, 6, 7) overcome the problems associated with projection in ambient light by utilizing the non-absorbing functionality of NPD-LCD film or LCMD film. NPD-LCD film is transparent for all visible wavelengths and regulates light only by scattering, that is, it only changes the light direction but does not absorb light. This property may be utilized to increase the brightness of projection screens.

For projection, ambient lighting conditions are important. Many projection screens require a dark environment. In order to broaden the possible applications for switchable projection glass panels, it is necessary to enhance the image quality of projection under a bright ambient light. Quality may be significantly improved by improving the contrast ratio. While bright portions of projected images can be easily enhanced by a more powerful projector, including a laser projector which uses laser beams as light sources, a black color cannot be created by a projector. Black portions of projected images are dependent only on the environment or color of the projection screen. Therefore, increasing projection lumens and/or darkening LCMD film may be helpful in improving image quality.

Figure 8:
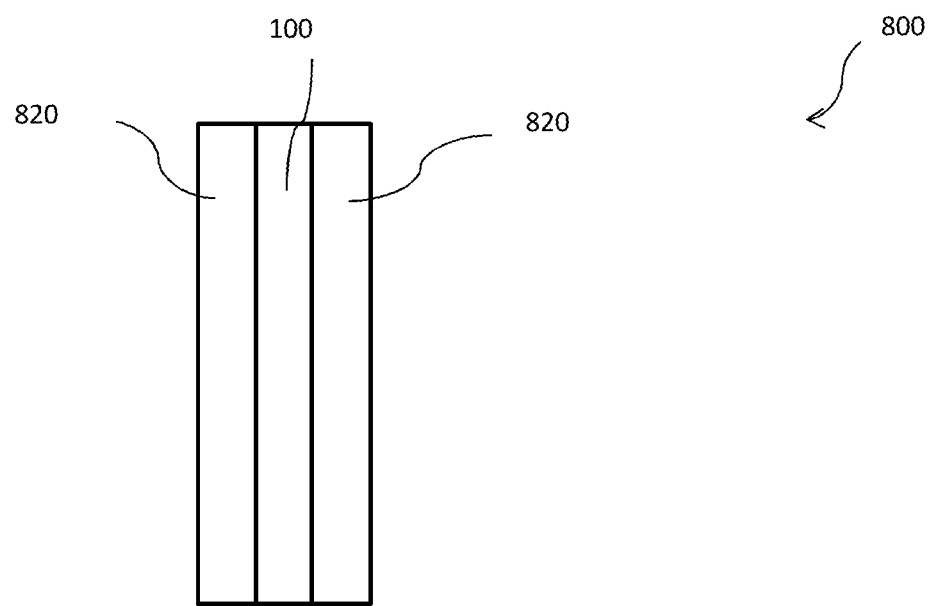
FIG. 8 is a cross-sectional view of a filtered LCMD film according to one or more embodiments of the present disclosure.

FIG. 8 is a cross-sectional view of a filtered LCMD film 800 according to one or more embodiments of the present disclosure. A color filter 820 including, for example window tinting film, may be added on one side or both sides of the LCMD film 100. Color filter 820 and film 130 may be fused together. In this embodiment the darkened LCMD film 800 may greatly increase picture quality under a bright ambient light. Dark LCMD film 800 is capable of providing a high contrast ratio under a bright ambient light. Many darkness levels of window tinting films are commercially available from 5% to 95% transmittance. Both sides may be used for projection and view. High quality projected images on dark LCMD film 800 may be achieved under most indoor lighting conditions by a common projector such as a 3000 lumens projector or more powerful projectors depending on projection sizes.

Figure 9A:
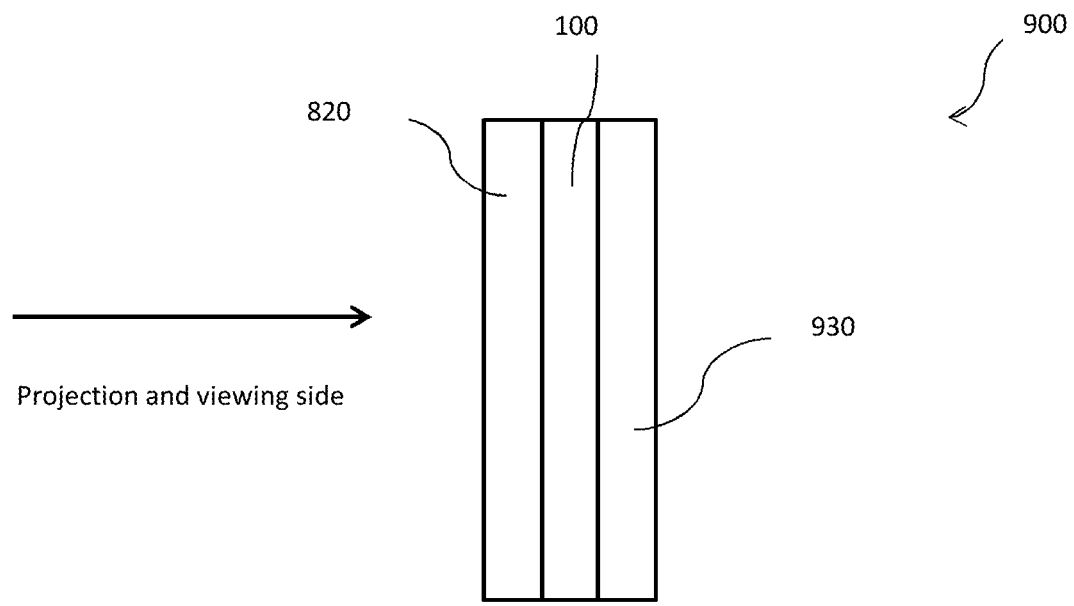
FIG. 9a is a cross-sectional view of an enhanced reflective LCMD film according to one or more embodiments of the present disclosure.

In front projection, it is possible to enhance projected image quality under bright ambient without increasing projector lumens. A reflective layer 930 is added on one side of the LCMD film with or without adding a color filter 820 on the opposite side. FIG. 9a is a cross-sectional view of an enhanced reflective LCMD film 900. A color filter 820 or window tinting film is added on one side of LCMD film 100 and a reflective layer 930 is added to the opposite side. Reflective layer 930 may include materials such as aluminum foil, silver color metallic paint, white color paint, mirror coating, metal plated coating, and metal plate. Gray window tinting film is a good option with relatively low cost. Color filter film including window tinting film and LCMD film are usually made of polyester film or PET film. For projection, color filter 820 and film 130 can be fused together. On another (right) side, transparent ITO coating 120 in LCMD film 100 can be replaced with a non-transparent and reflective metal coating, such as aluminum or nickel or silver coating. The combination of using different color filter films and reflective layers provides many advantages to improving the quality of projected images.

Figure 10:
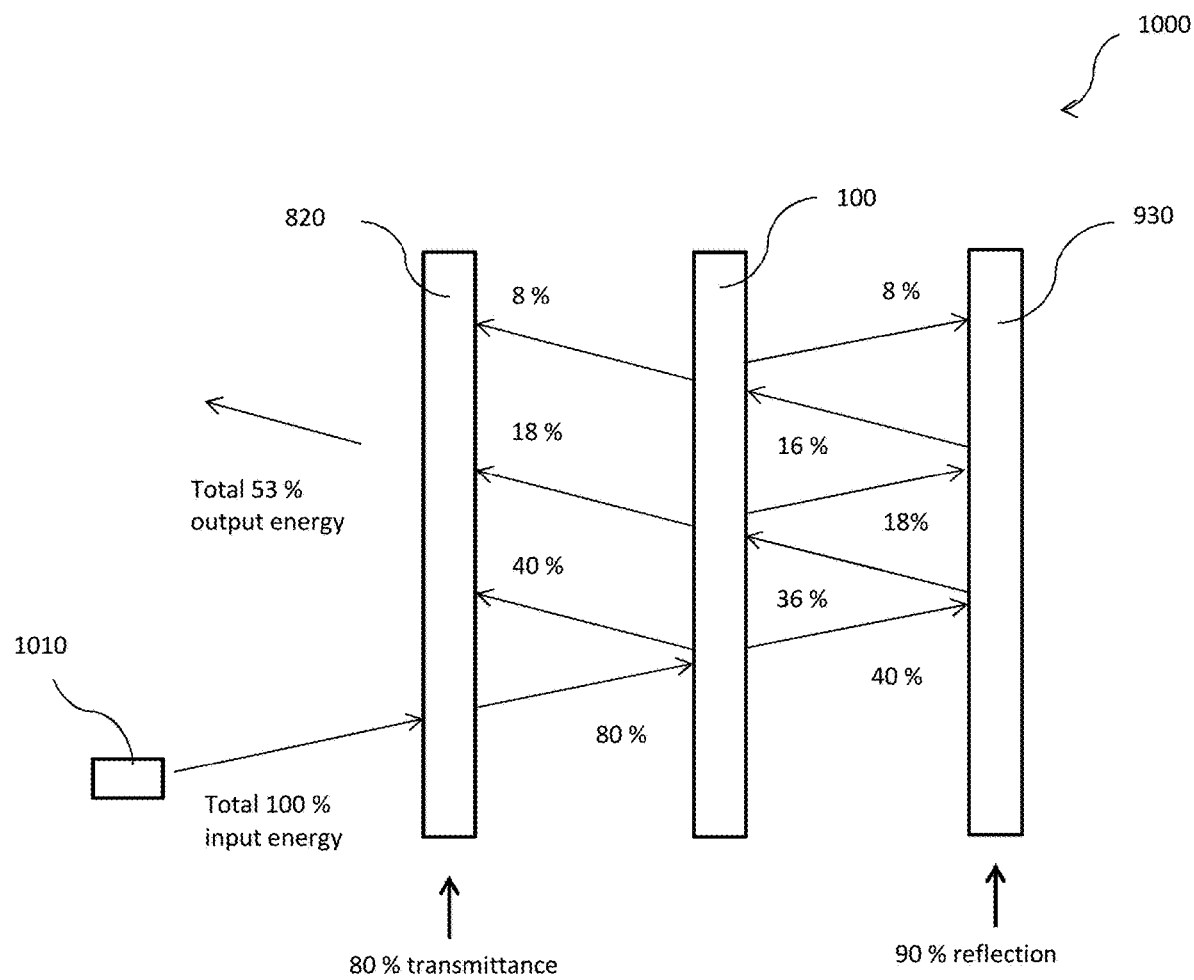
FIG. 10 is an exploded cross-sectional view of the enhanced reflective LCMD panel of FIG. 9a illustrating the optical behavior of the light energy.

An enhancement mechanism of dark reflective LCMD film 1000 may be analyzed in the exploded view of FIG. 10. The reflective layer 930, the LCMD film 100, and the color filter 820 are separated to show the transmitted light intensity or energy and scattered light intensity. A projector 1010 is used as input light energy. In this embodiment, a color filter 820 or window film with 80% transmittance is used, and an NPD-LCD film 100 with spherical scattering is used as a projection surface. In this embodiment, a reflective layer is silver color paint with 90% refection. The calculated result shows that output intensity is 53% which is greater than scattering 50% from original NPD-LCD film. However, such output energy comes from the dark surface of enhanced reflective LCMD film 900 (e.g., NPD-LCD film), therefore, contrast will be much better than that of the original NPD-LCD film. In this structure, a reflective layer is used to reflect scattered light back to the viewing side. Since increasing projector lumens may increase the bright portions of projected images and increasing the darkness of color filters or window films may increase the darkness of projected images, both brightness and contrast ratio may be adjusted as needed, this method and ability can effectively provide high quality projection images under bright ambient light like a normal indoor lighting condition. Actual tests show that this method can present great video images under 1500 lumens ambient light condition with 3000 lumens projectors. Therefore, projection in any normal indoor environment may be easily handled with dark LCMD film 800 or enhanced reflective LCMD film 900.

Figure 9B:
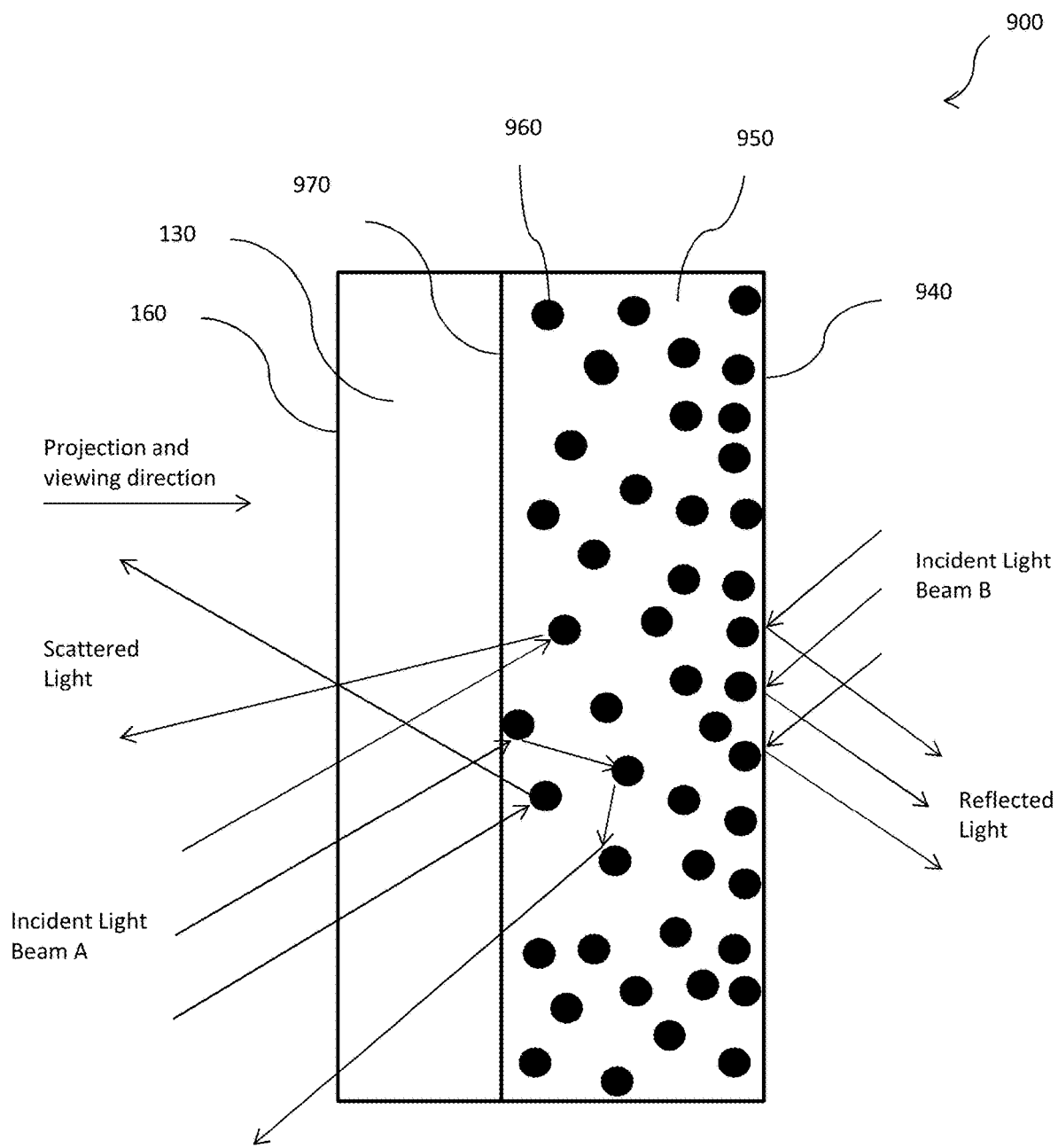
FIG. 9b is an illustration of localized scattering on a metallic painted surface.

Although each of above mentioned reflective coatings or materials, such as aluminum foil, silver color metallic paint, white color paint, mirror coating, metal plated coating and metal plate may easily reach 80% reflection rate, there are three different reflective mechanisms involved. Each mechanism has a different optical efficiency and cost. The mechanism of a mirror coating is a pure reflection. If a mirror coating replaces an ITO coating, this is an improved situation which reflects the original light information back at the original spot. However, it is expensive. If a mirror coating or plating is outside the LCMD film, the thickness of the film will shift light information slightly. Putting a regular glass mirror in the back of the LCMD film will not work because of the relatively large distance between the LC-polymer layer and the mirror surface. The mechanism provided by white color paint on the outside of the LCMD film is pure scattering. It increases the overall brightness but does not increase contrast, because two scattering layers, or LC-polymer layer 110 and the white paint layer, on both sides of film 130 may easily allow light to travel a longer distance to other locations. Referencing back to FIG. 9b, the mechanism provided by silver color metallic paint is localized reflection. Due to solvent evaporation from paint surface 940, reflective metal particles 960 are not evenly distributed in paint layer 950. On paint surface 940, metal particles have a high distribution density and reflect light to incident light B (right) side, which results in a shining, metal-like surface. On the side of paint interface 970, metal particles have a relatively lower distribution density which is equal to a rough inter-surface 970, therefore, light is scattered back to incident light beam A (left) side and will show a darker color. Since metal particles suspended in the paint layer 950 are not transparent, they allow incident light to get into paint layer 950 and scatter back to the incident side, which scatters the single-direction incident light in all directions. Incident light enters into the paint layer 950 and inter-reflection occurs among small localized particles. Incident light can only exit from the paint layer near vertically as a reflection. This phenomenon helps to localize light and reduce noise, therefore, bright areas become brighter and dark areas are not affected. As a result, contrast ratio is greatly increased. It is easy to see the visual effect from increasing contrast ratio with silver color metallic paint. As discussed above, the function of increasing contrast ratio is performed using a color filter or window tinting film 820; silver color metallic paint can also contribute to contrast. That is why image quality may be improved on film 900 without color filter 820. It is very effective and low cost.

Combinations using different color filters and reflective layers have many advantages in handling bright ambient light which broadens the applications for SPP. LCMD Film 100 in apparatus 300 may be replaced with dark LCMD film 800 or enhanced reflective LCMD film 900. If the reflective layer is used without using color filter 820 in film 900, projection brightness may be doubled, therefore, larger projection image can be presented with same brightness level, or a smaller projector can be used to achieve the same size and brightness. It should be noted that enhanced reflective LCMD film 900 is non-transparent, but LC-polymer matrix 110 can still be switchable and controllable with different levels of scattering. With different applied AC voltages, the viewing angle and brightness at vertical view may be adjusted.

Increasing contrast ratio contributes an important feature to NPD-LCD film and SPP as an improved projection screen, because NPD-LCD film already has many great features for projection. NPD-LCD films are noted for their Viewing Angle Independent (VAI) brightness or having the same brightness in 360°. This special projection capability allows an incident light to come from any angle to any point on a surface of NPD-LCD film and the light spot will result in spherical scattering. Scattered light will be equally distributed at any angle in space as well as on both sides of the NPD-LCD film. These characteristics allow dark LCMD film 800 and enhanced reflective NPD-LCD film 900 to meet all of the highest standards of projection screen with high contrast ratio, wide viewing angle, suitable screen gain and best uniformity of brightness.

Third generation LCMD or NPD-LCD film is made with 100% optical transparent non-linear materials and liquid crystals. It relies on scattering to regulate light. In other words, it only changes the direction of light, but does not absorb any visible light. Therefore, it can completely deliver all color information provided by a projector to viewers. All other projection screens with high contrast ratio always absorb some degree of light and lose some information from a projector. Not only does NPD-LCD film provide for a true color apparatus due to its ability to accurately transfer the original color spectrum of a projected image, but also provides other excellent parameters for projection screens like screen gain and half gain angle, etc. It is important to mention that due to its absolute wide viewing angle, half gain angle for NPD-LCD film does not exist. For all existing projection screens, brightness in vertical view is usually brighter than in tilted view. The angle having 50% brightness in vertical view is called half gain angle. The half gain angle usually falls within 90 degrees. This is an important index for projection, and reflects the quality of the viewing angle and the uniformity of brightness of a display. When NPD-LCD film allows a light to travel in a curved way in a non-linear matrix to have the same brightness at any angle, some characteristics of linear optics such as incident angle and viewing angle lose their physical meanings. Beyond 90 degree, the definition of half gain angle loses its original meaning for reflection. This feature could greatly impact projection field and be very useful for advertising requiring very wide viewing angles. Furthermore, NPD-LCD film with spherical scattering has another advantage of using a short throw projector which has a throw ratio (i.e., projection distance over projection size in diagonal) of less than 1. Since a short throw projector is mounted quite close to a projection surface, such mounting may eliminate reflection from a projector toward viewers and save space. Most projection screens with a high contrast ratio do not allow use of a short throw projector, because treatments for high contrast ratio will sacrifice a wide viewing angle.

Dark LCMD film 800 retains all original features of LCMD film 100, but can handle brighter ambient light. Dark LCMD film 800 has some advantages as compared with dichroic LCMD film of which dyes are added in LC-polymer matrix. As compared with using separated color filter 820 and dichroic dyes, apparatus 800 using separated color filter 820 has better UV stability because many color filters or window tinting films are made of inorganic pigments or dyes which are much more stable than the organic dyes used in dichroic LCMD film. Dichroic LCMD film must use organic dyes because of the solubility of liquid crystals and guest-host effect. Another advantage is that using color filter or window tinting film does not affect response time and shorten the lifetime and reduce stability of LCMD film because organic dyes are more vulnerable to heat and UV than liquid crystals. This is very useful in applications requiring color or darkness, such as on switchable projection window, projection billboard, window projection, glass wall, automobile, airplane, ship, and traffic signs or in OLED (organic light emitting diode) TV and 3D TV.

With the air-sandwiched structure and methods of image improvements, sandwiched switchable projection glass may have many new applications. Referencing FIGS. 11*a* and 11*b*, one embodiment is switchable projection billboard (SPB) 1100, which includes SPP (e.g., apparatus 300) in front of a billboard 1120 and space 1130 between SPP 300 and billboard 1120. A frame 1140 may be an open system, an enclosure, or simply omitted. During daytime, the billboard may have a regular function showing still images when the NPD-LCD film is in a clear state. At night, video images can be shown on SPP when the NPD-LCD film is in an opaque state. Such multi-functional billboards may enhance its use in advertising. Although LED billboards have been used for video images, its expensive cost, difficulty in repairs, and low resolution limit its application. By comparison, a switchable projection billboard may only be 5-10% of the cost and 5% of the energy consumption of an LED billboard. A reflective layer and laser projector may provide good brightness. Reflective layer plus NPD-LCD layer and laser projector may give both good brightness and good viewing angle. Reflective layer, NPD-LCD layer, and color filter layer and laser projector may give high quality images. At night, regular billboards need lights mounted in front of the board for visibility. This position is good for mounting projector(s). Wireless technology is easily used to manage advertising content. Projectors with long lasting LED light bulbs or microwave light bulbs may be used to build a virtually maintenance-free switchable projection billboard.

Figure 11A:
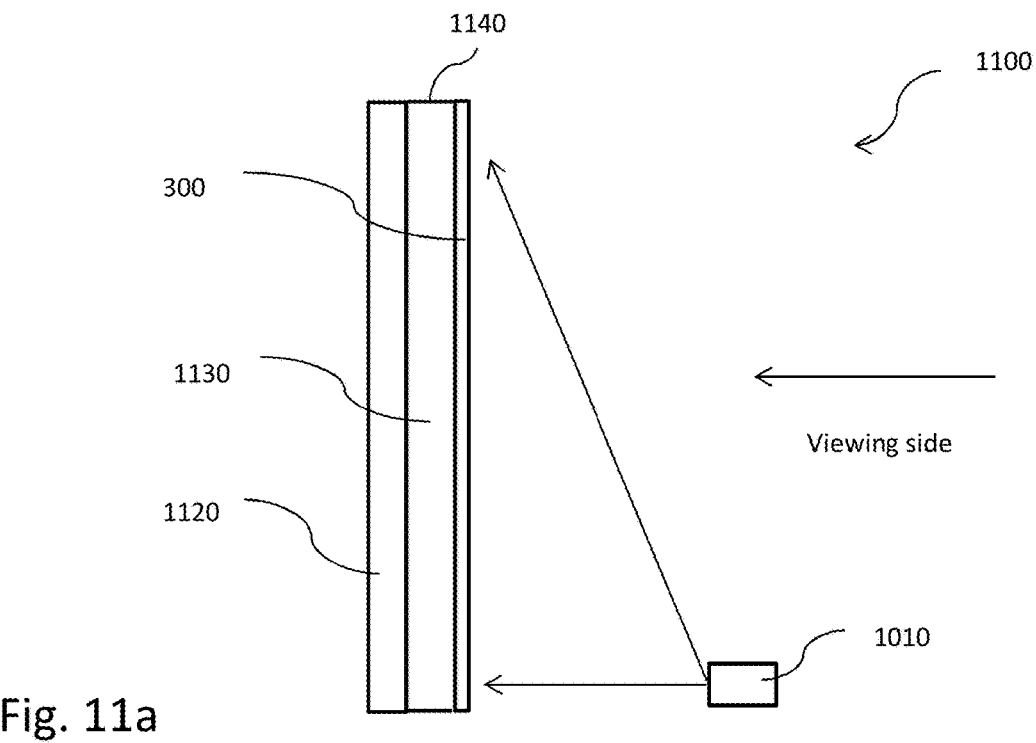
FIG. 11a is a side view of a switchable projection billboard with a switchable projection panel according to one or more embodiments of the present disclosure.
Figure 11B:
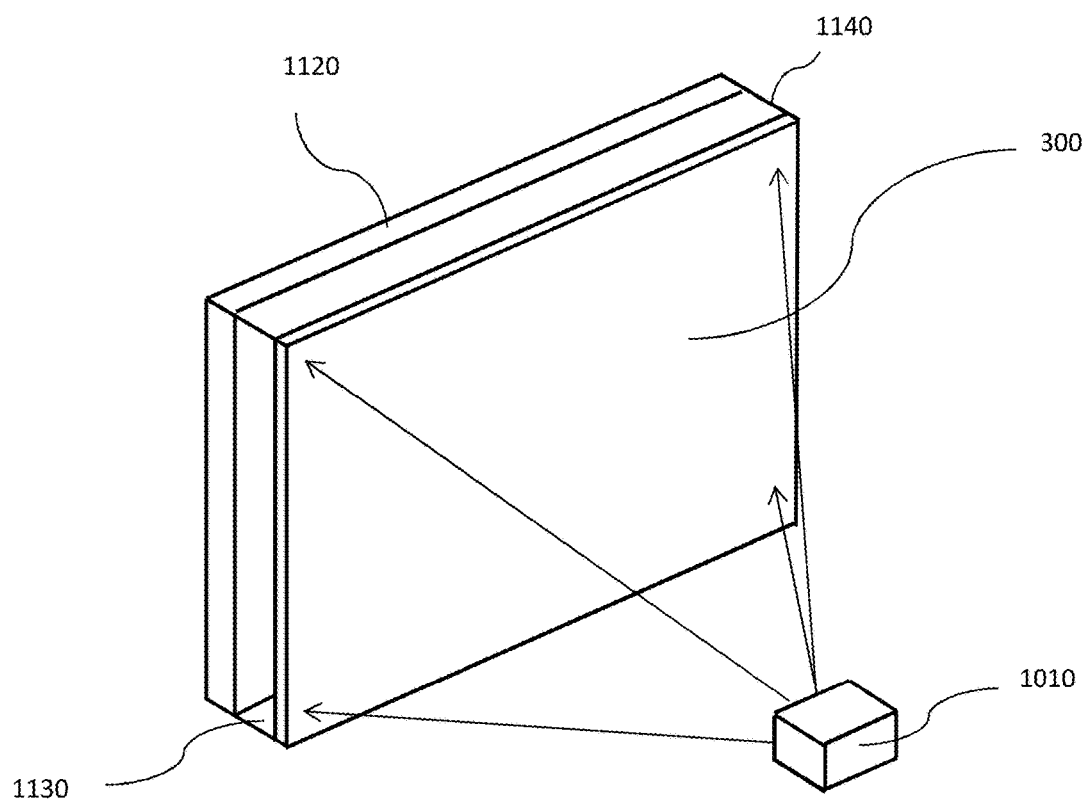

Referencing FIGS. 11a and 11b, a projector 1010 is placed in front of SPP 300 for front projection. A short throw projector may be placed in front of SPP 300 a short distance away. The short throw rate (ratio of projection distance to projected size in diagonal) may be smaller than 0.3. Some short throw projectors can be closely or directly mounted on the projected surface. The projector may be placed either at the bottom or top of SPP 300. There is a distance or space between SPP 300 and billboard 1120. The projection distance (throw) may be short or long. When the distance is short enough, the projector 1010 may be placed in between SPP 300 and billboard 1120 for rear projection. Billboard 1120 may be a flat sign or other types. The switchable projection billboard provides a basic concept, and an advertising board may have at least two surfaces with different functions. One surface has still pictures showing during daytime. Another surface is a blank surface suitable for projection at night. The two surfaces are changeable or switchable.

Figure 12A:
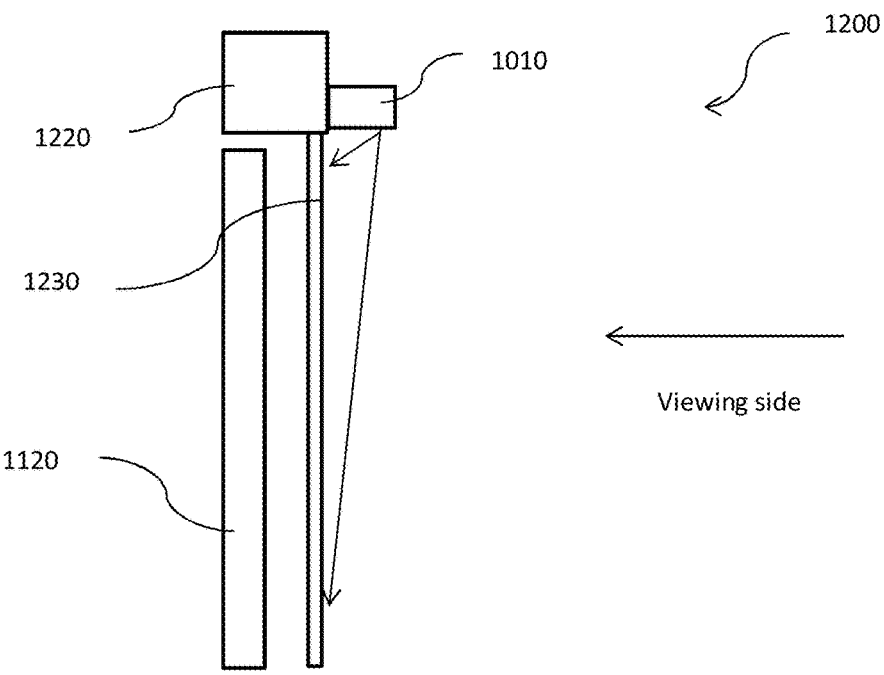
FIG. 12a is a side view of a switchable projection billboard with a rotary system according to one or more embodiments of the present disclosure.
Figure 12B:
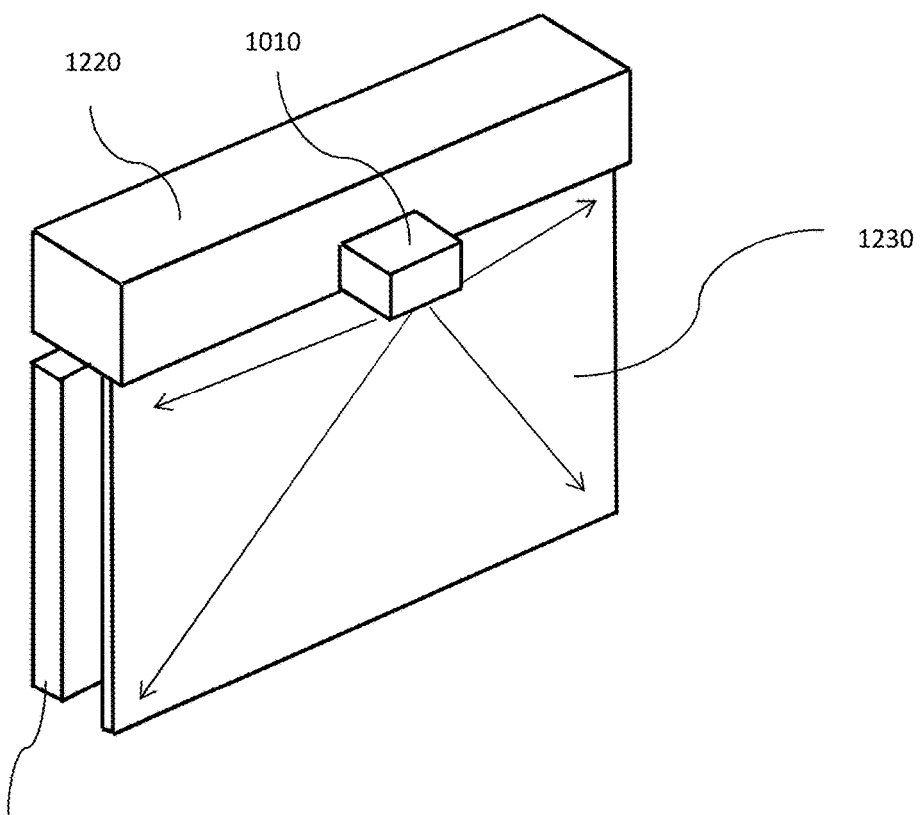

Switching mechanisms for projection billboard includes electric, mechanical, and rotary. Referencing FIGS. 12a and 12b, for example, a motorized screen system 1220 similar to a motorized window shade, outdoor rotary blinds, or hurricane shutter can be directly mounted on billboard 1120. The SPP may be omitted. Projection surface 1230 of mechanically switchable projection billboard 1200 may have different materials suitable for projection, such as cloth, plastic, fiberglass, metal, and painted surfaces. Switching methods may include mechanical or electrical mechanisms. Any mechanisms or methods to provide additional surfaces suitable for projection may also be used for this purpose. A projector may be mounted on the top or the bottom of the projection screen.

Figure 13A:
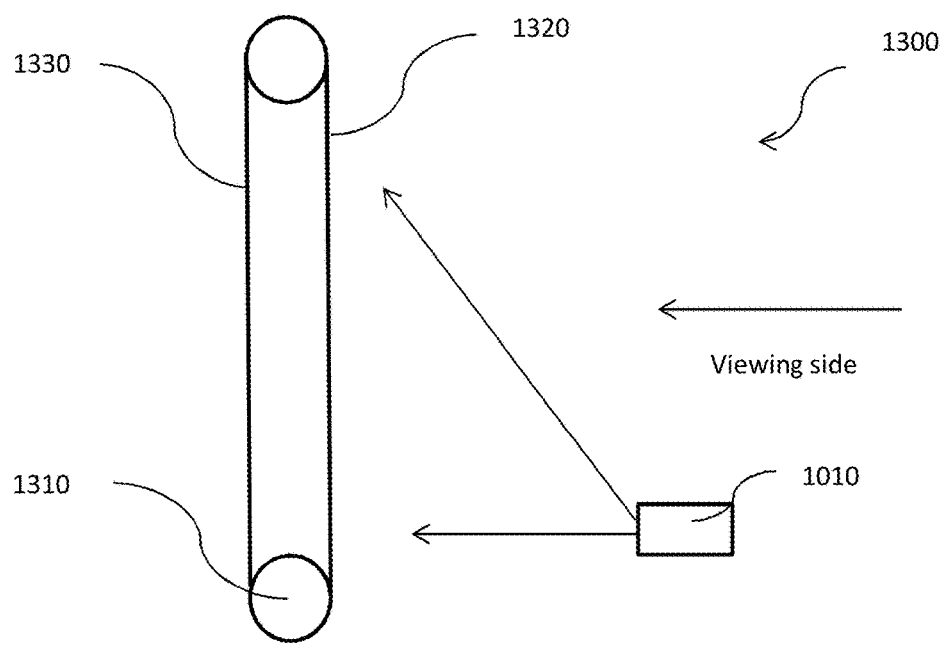
FIG. 13a is a side view of a switchable projection display with scrolling system according to one or more embodiments of the present disclosure.
Figure 13B:
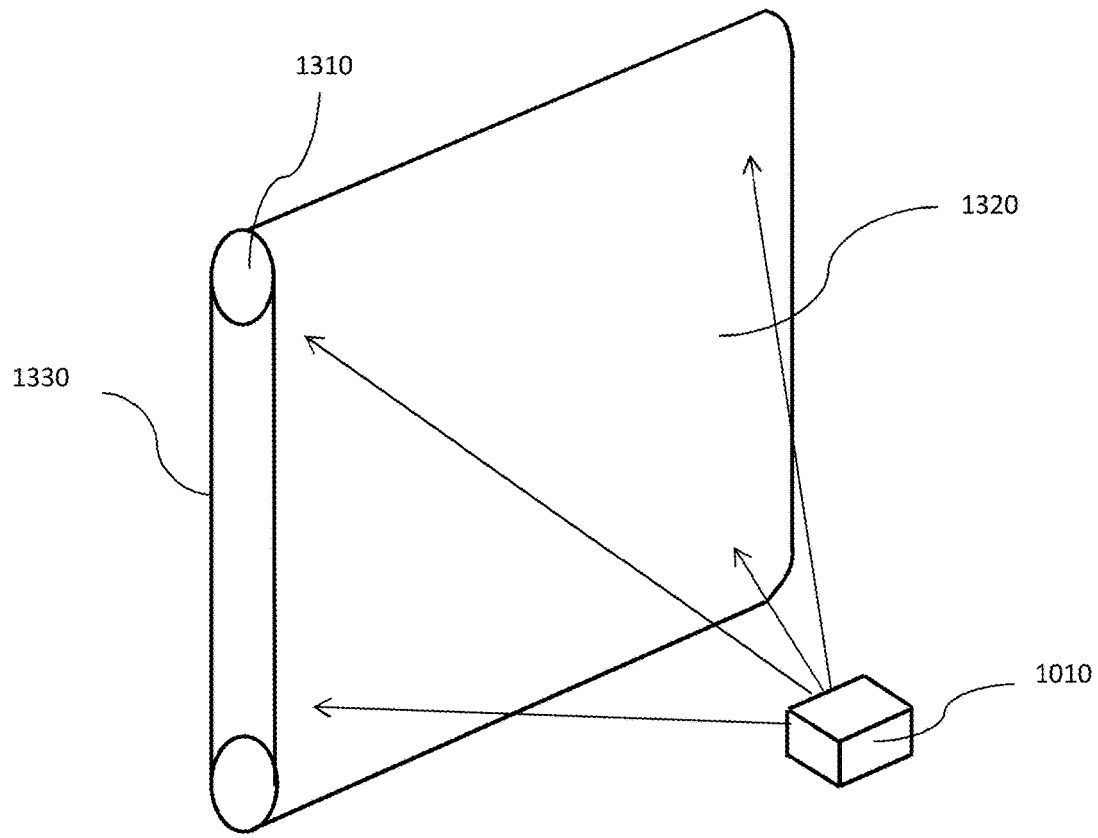
FIG. 13b is a perspective view of the switchable projection display of FIG. 13b.

Referencing FIGS. 13a and 13b, the switchable projection billboard may be a scrolling projection billboard 1300 with scrolling system 1310. During daytime, billboard 1300 may show still images on side 1330. At night, a blank side 1320 is used for showing projected video images. Through use of scrolling system 1310, viewing sides 1320 and 1330 may be alternated for use with projector 1010. There is a non-loop scrolling design with a single layer between two rollers, so that it is suitable for front or rear projection. This scrolling projection billboard 1300 enhances advertising ability by combining still images and video images together, which keeps costs low.

In FIGS. 14a and 14b, the switchable projection billboard may comprise a changeable, triangular prisms billboard 1400. For improved image quality, one side of the triangular prisms may be made of enhanced reflective NPD-LCD film 900 or other materials suitable for projection. During daytime, two image sides 1420 of the changeable triangle prisms may provide for image advertising. The two image sides 1420 have corresponding or interrelated images across each triangle prism in the set. At night, projected images may be displayed on the white side 1410 of the triangular prisms to show video images. This triangular prisms billboard 1400 enhances advertising ability by combining still images, changeable images, and video images, while keeping costs low.

Indoor brightness is usually much lower than outdoor brightness. For example, in an airport, brightness is usually under 300 lumens. In offices or shopping centers, brightness is usually around 500 lumens. Even in malls with sky lights and roof windows, brightness is usually under 1,000 lumens. On the other hand, brightness in the shade of an outdoor area at noon may still be greater than 10,000 lumens. In normal projection, a dark ambient light is usually required in theaters and home theaters. Replacing the LCMD film 100 in apparatus 300 with dark LCMD film 800 or enhanced reflective LCMD film 900 may provide for greater quality of projected images at ambient light conditions over 2,000 lumens. Therefore, an SPP such as apparatus 300 with LCMD film 100, dark LCMD film 800, or enhanced reflective film 900 may have many indoor applications under almost any indoor condition. There are various forms in use for these SPP display devices.

Figure 15:
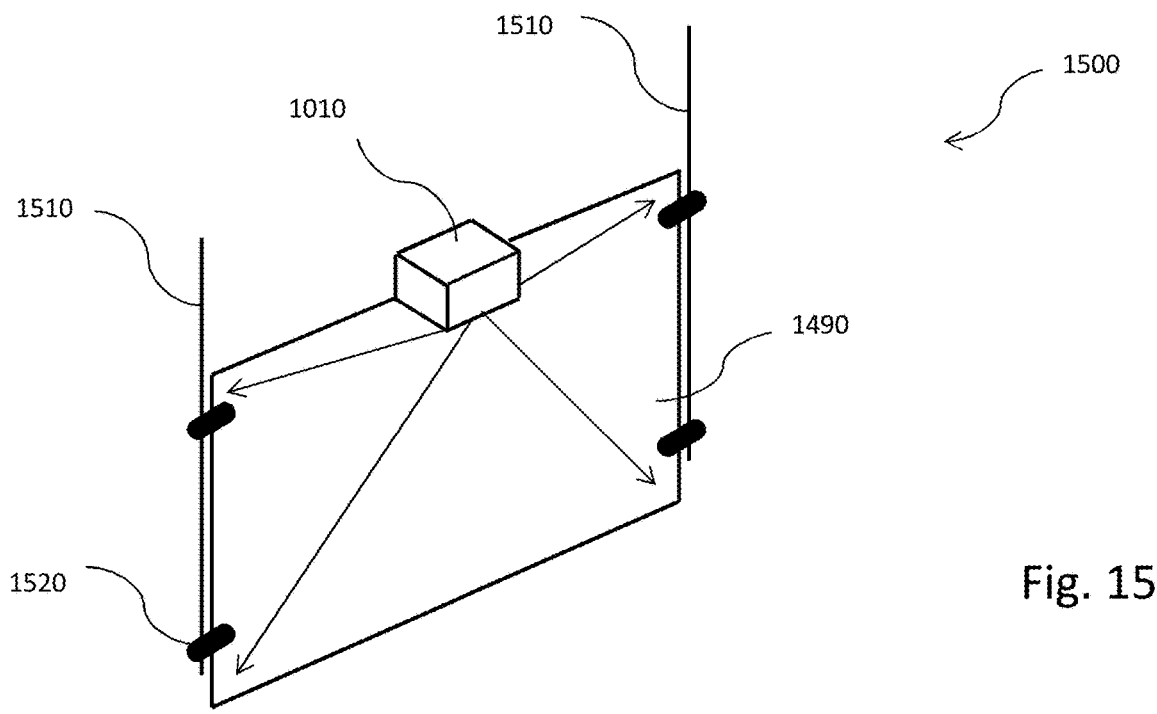
FIG. 15 illustrates a switchable projection display system with ceiling mounting mechanism according to one or more embodiments of the present disclosure.

For examples, FIG. 15 illustrates an SPP display system 1490 (e.g., same or similar to 300, 800, 900) as a component of a hanging system 1500. The SPP 1490 may be suspended under a ceiling with a cable system 1510. With use of clamping heads 1520 in cable system 1510, there may be no need to use edge seal 320 in the SPP 1490. If LCMD film 100 or dark LCMD film 800 is used, the SPP display system 1490 can be viewed from both sides. If an enhanced reflective LCMD film 900 is used, SPP display system 1490 can be viewed from one side for front projection.

Figure 16:
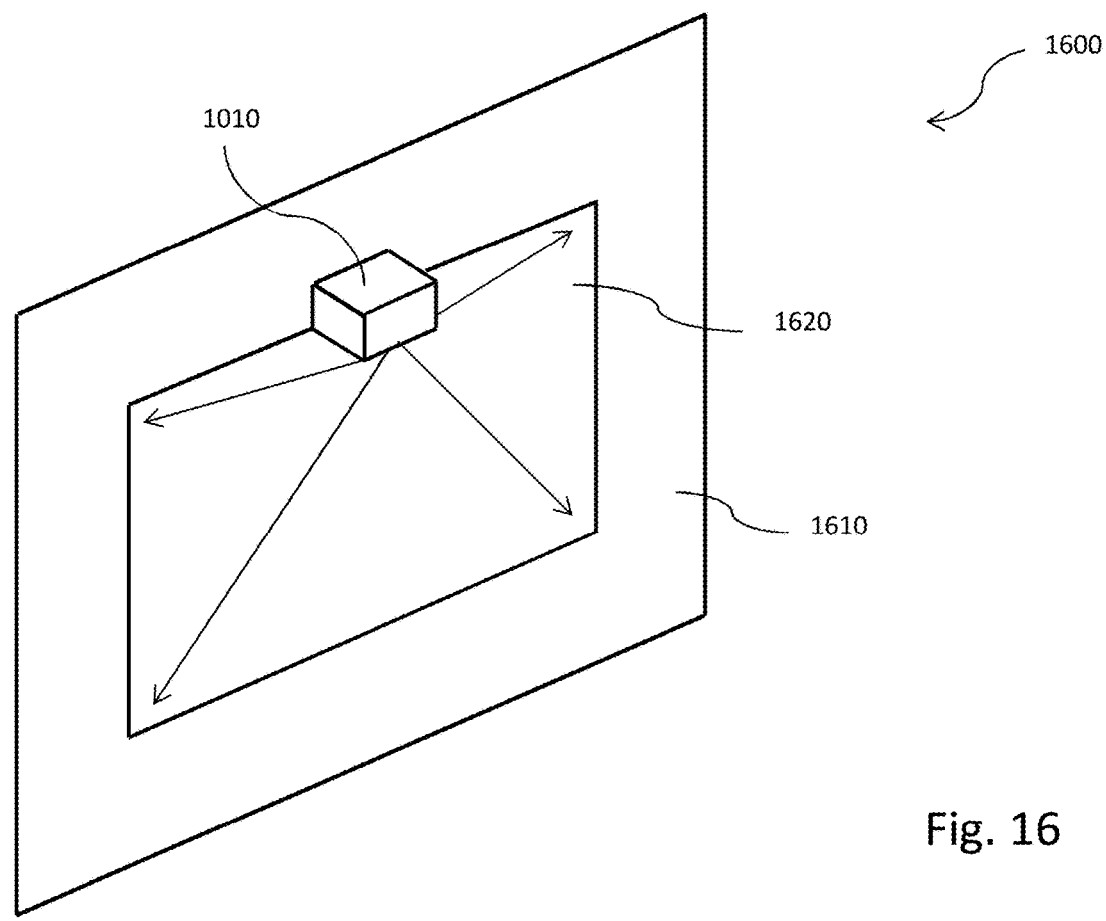
FIG. 16 illustrates a switchable projection display system with wall mounting mechanism according to one or more embodiments of the present disclosure.

Referencing FIG. 16, a wall-mounted system 1600 includes a SPP display system 1620 (e.g., including apparatus 300, 800, or 900) mounted on a wall 1610. If LCMD film 100 or dark LCMD film 800 is used with the SPP display system 1620, the projected image may be viewed from both sides. If reflective film 900 is used, the projected image may be viewed from a single side. Wall 1610 comprises all kinds of non-transparent regular walls and transparent glass walls and potable panels. Some small short throw projectors may be mounted closely or directly on the projection surface. With current projection technology, a projector may provide TV, movie, and computer information. Such devices have many functions and uses such as see-through, adjustable opacity, privacy & energy saving, movie, TV, presentation, both side viewable, and dry-erase whiteboard. Such applications may be used as store banners. When rear projection is used, the projection surface may be the front surface of the enclosure and the projector is protected residing inside the enclosure.

Figure 17:
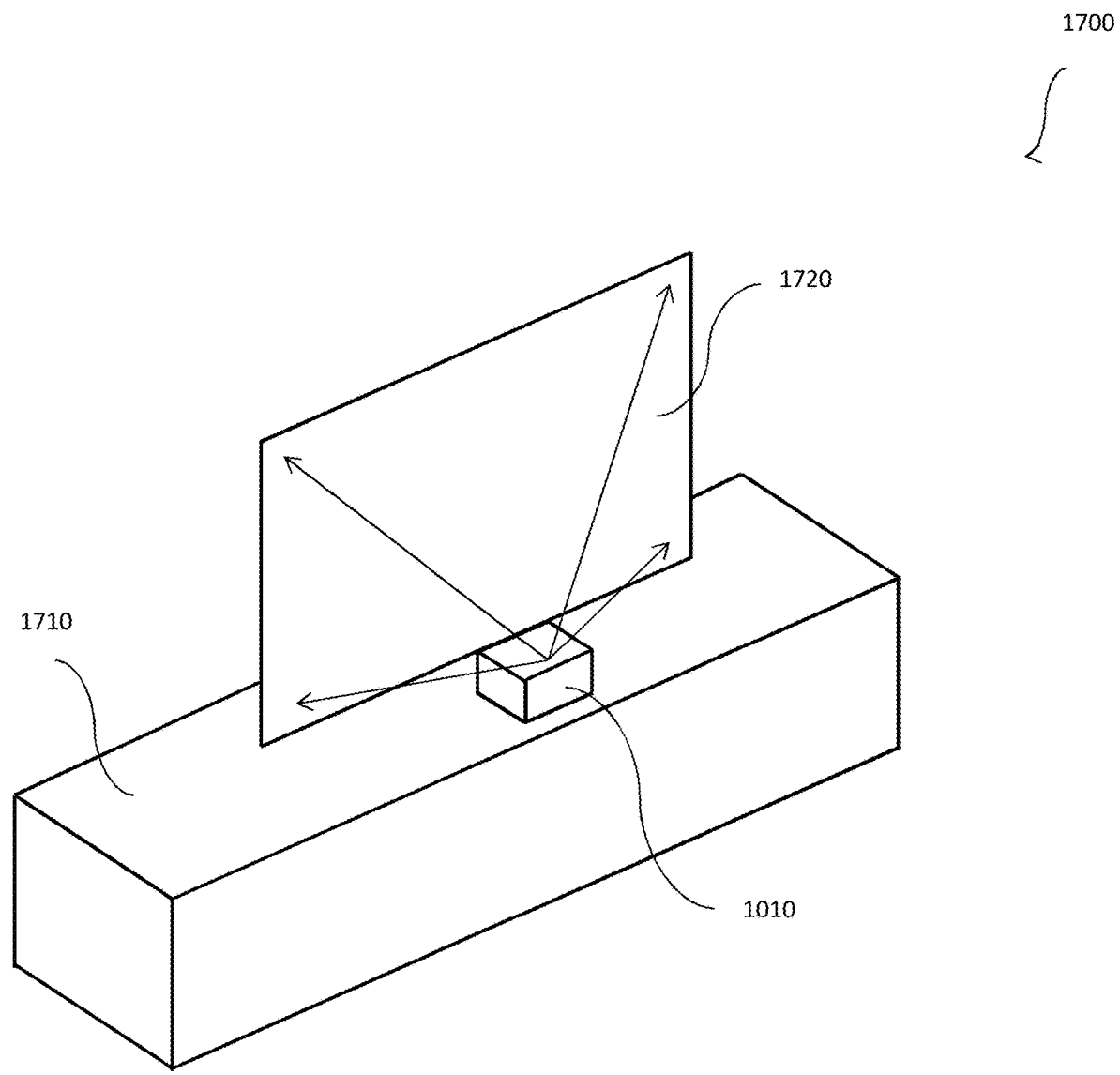
FIG. 17 illustrates a switchable projection display system with a table, showcase, or cabinet mounting mechanism according to one or more embodiments of the present disclosure.

FIG. 17 shows a SPP showcase 1700 in which SPP 1720 (e.g., including apparatus 300, 800, or 900) is mounted on a table, showcase, cabinet, or sales counter 1710 for viewing from both sides if LCMD film 100 or 800 is used, or for viewing from one side if enhanced reflective LCMD film 900 is used. The SPP 1720 could may include a wall round. Wheels may be mounted under cabinet 1710 to make it easy to move. Cabinet 1710 may be transparent or non-transparent and may be made of glass or plastic or other materials for furniture. Showcase 1700 may be used in stores, malls, schools, offices, or inside homes. If used for sales, some product samples may be placed on or inside the cabinet. Showcase 1700 may display images of merchandise and/or information regarding the merchandise. It may be more efficient for a seller to provide such information to consumers at a sale site. In normal sales and advertising, these three key factors are usually separated, causing an inconvenience and a low efficiency in convincing consumers to purchase.

If an anti-reflective coating is applied on every air-solid interface of any of the devices mentioned above, image quality may be improved. However, there is practically no perfect anti-reflective coating in existence. Most anti-reflective coatings may reduce, but not completely eliminate reflection. Therefore, total internal reflection in laminated LCMD glass may still occur and problems may still exist. Additionally, anti-reflective coatings are generally expensive and the high cost has greatly limited its uses. Thus, there are limited applications for anti-reflective coatings, and improper use may even increase blur in a panel.

Figure 18:
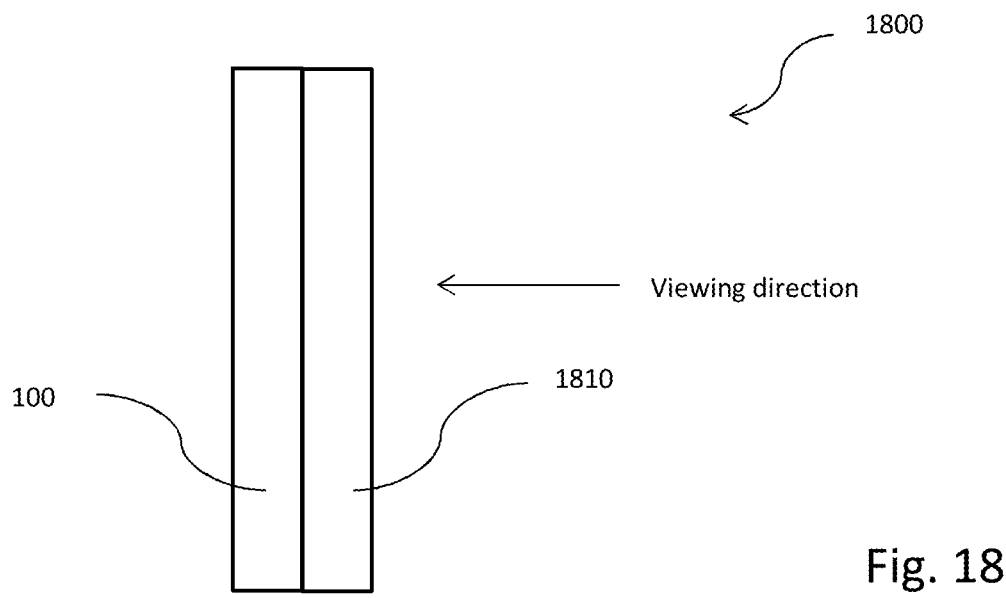
FIG. 18 is a cross-sectional view of a modified LCD panel according to an embodiment of the present disclosure.
Figure 19:
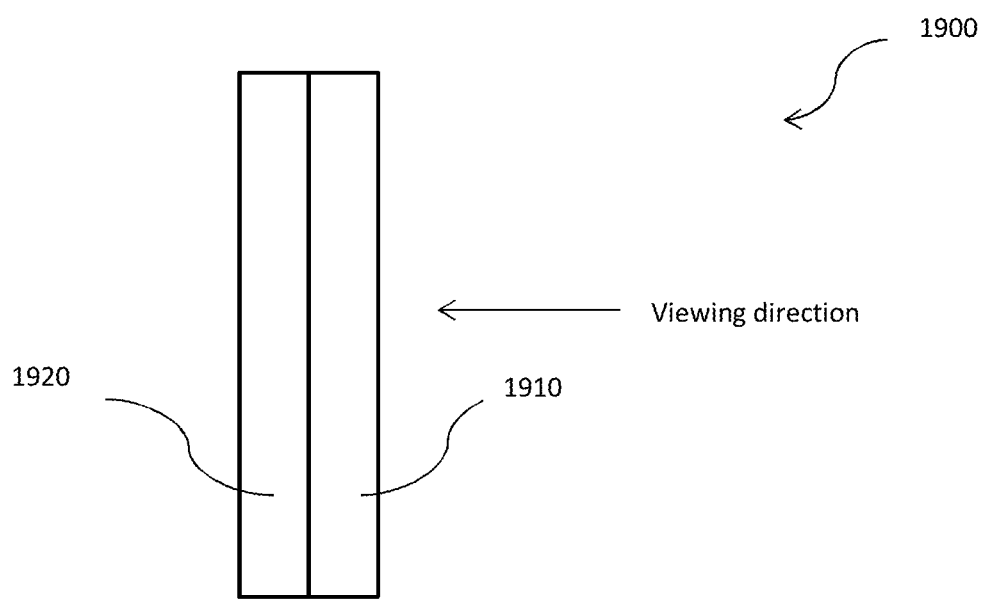
FIG. 19 is a cross-sectional view of a modified OLED panel according to an embodiment of the present disclosure.

LCMD film 100 or dark (e.g. color filtered) LCMD film 800, due to their switching and light diffusion functions, are also suitable for use in television (TV) monitors, computer monitors, or other type of monitor used for electronic visual displays. FIGS. 18 and 19 provide modified LCD and OLED panel embodiments for use in a variety of monitors or other uses. FIG. 18 illustrates a cross-sectional view of an LCD panel 1800 according to an embodiment of this disclosure. In this embodiment, an LCMD film 100 is coupled to a generally transparent LCD device 1810. In various embodiments, an open space or a transparent material may be located between the LCMD film 100 and the LCD panel 1810. The LCD panel 1810 may be without a traditional illumination source such as cold cathode fluorescent lamps (CCFL) backlighting. When positioned in a window opening, in front of a traditional building window, or near another source of natural or artificial light, the LCMD film 100, switched to an opaque state, diffuses the incoming natural or artificial light to provide a backlighting panel for the LCD panel 1810. In daylight conditions, the LCMD film 100, as a backlighting source utilizing natural light, provides energy cost savings as compared to traditional LCD backlighting sources. When the LCMD film 100 is switched to a clear state, the LCD panel 1800 becomes generally transparent. In this configuration, natural light passing through the clear LCMD film 100 illuminates the LCD panel 1800. In this transparent mode, LCD panel may be suitable for a variety of purposes including transparent "heads-up" displays which allow users to view displayed information while also viewing the surrounding environment. These transparent displays may be useful to provide a safer and more controllable work environment for a variety of workers including loading dock operators, air traffic control workers, airport ground crews, surgeons, pilots, flight operation officers, military troops, or other users that benefit from receiving data while maintaining awareness of the surrounding environment. Other applications for the LCD panel 1800 include use as a top or front panel for a sales cabinet. Installed lighting within the cabinet may be diffused by the LCMD film 100 to backlight the LCD panel 1810 and display images on the cabinet. With this embodiment, viewers may view advertising or instructions on the cabinet and see merchandise inside the cabinet.

FIG. 19 provides a cross-sectional view of an OLED panel 1900 according to an embodiment of this disclosure. In this embodiment, a switchable film 1920 is coupled to an OLED display 1910 (e.g. in film or in panel format). The switchable film 1920 may be, for example, an LCMD film 100, a dark (e.g. color filtered) LCMD film 800, a dichroic LCMD, a dichroic NPD-LCD, a reverse mode dichroic NPD-LCD, or other devices with electrical switching function between transparent and non-transparent modes. Switchable film 1920 may be positive mode or negative mode. The switchable function of film 1920 allows the OLED panel 1900 to provide situation-specific visual effects and to provide versatility in various applications. The OLED panel 1900 may be flexible and thus able to wrap or generally conform to a variety of surfaces including planar surfaces, curved surfaces or irregular surface. Alternatively, the OLED panel may be mounted as a banner, flag, or other display with freedom of motion. The OLED display 1910 is self-illuminating and therefore may not require additional backlighting.

In one embodiment, the switchable film 1920 may be an LCMD film 100 having a transparent mode and an opaque mode. The OLED display 1910 may have a transparent mode and a non-transparent mode. In the non-transparent mode, the OLED display 1910 may be suitable for displaying images such as TV images or computer graphics. With the OLED display 1910 in transparent mode (and with the LCMD film 100 in transparent mode), the OLED panel 1900 is see-through. This see-through configuration may be suitable for commercial applications in which the consumer is invited to see through to displays or merchandise on an opposite side of the OLED panel 1900. However, this configuration may be generally unsuitable for watching TV or a graphical image on the OLED display 1910 because the background visible through the panel 1900 may act as noise information, distracting the viewer.

In another embodiment, the switchable film 1920 may be a darkened LCMD film 800. In an opaque state, the darkened LCMD film 800 provides a darkened, non-transparent background color for a non-transparent mode of OLED panel 1900. In this mode, the darkened LCMD film 800 blocks the view of distractions behind the OLED panel 1900. When the darkened LCMD film 800 is in a clear state, the OLED panel 1900 is in a transparent mode.

In another embodiment, the switchable film 1920 may be a dichroic (e.g., including dichroic dyes) LCMD film. Although a darkened LCMD film 800 and a dichroic LCMD film may have the same degree of darkness in opaque states, the dichroic LCMD film has a brighter clear state than the darkened LCMD film 800. This is because the darkness of darkened LCMD film 800 in a clear state is fixed, but the darkness of a dichroic LCMD film in a clear state is changeable. Thus, an OLED panel 1900 may have the brightest (i.e., least darkened) transparency, using a dichroic LCMD film as the film 1920.

With either darkened LCMD film 800 or dichroic LCMD film as the switchable film 1920, if a positive mode switchable film 1920 is used, a transparent OLED panel 1900 is achieved when both the OLED display 1910 and the switchable film 1920 are powered on. In this configuration, however, the OLED panel 1900 is not transparent when powered off because the switchable film 1920 becomes opaque. Often, users will prefer OLED panels 1900 to be transparent in both powered on and off states. To achieve this configuration, a reverse or negative mode switchable film 1920 is used so that when power to both the film 1920 and the OLED display 1910 is off, the switchable film 1920 and thus the OLED panel 1920 becomes transparent. In this transparent mode, the panel 1900 uses less energy because the clear state of reverse mode switchable film 1920 does not require energy. In this configuration, the OLED panel 1900 provides a fail-safe function suitable for use in moving vehicles like cars, ships, or airplanes. In this configuration, if the OLED display 1910 is powered on and the switchable film 1920 is powered off, the OLED panel 1900 is in a transparent mode. If the switchable film 1920 is powered on while the OLED display 1910 is powered on, the OLED panel 1900 is in a non-transparent mode.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A display system comprising:
    a first layer having opposite first and second sides, wherein the first layer includes a liquid crystal microdroplet display (LCMD) switchable between transparent and opaque states in response to a change in an applied electrical voltage; and
    a second layer coupled to the first side of the first layer, the second layer including a reflective layer; and
    a projector providing images onto the first layer from the second side of the first layer.

2. The display system of claim 1 wherein the reflective layer includes a plurality of metallic particles suspended in a polymer medium.

3. The display system of claim 1 wherein the projector includes a light source, the light source including one or more laser beams.

4. The display system of claim 1 wherein the projector has a short throw capability.

5. The display system of claim 1 wherein the first layer further includes a color filer.

6. The display system of claim 1, further comprising:
    a surface, wherein said surface includes the first layer configured for showing projected images;
    a cabinet coupled with said surface; and
    wherein said projector provides images on said surface.

7. The showcase apparatus of claim 6 wherein said projector has short throw capability.

8. The showcase apparatus of claim 6 wherein the projector includes a light source, the light source including one or more laser beams.

9. A panel apparatus comprising:
    a transparent display device; and
    a reverse mode liquid crystal microdroplet display (LCMD) coupled to the transparent display device.

10. The panel apparatus of claim 9 wherein the transparent display device includes liquid crystal display (LCD) device.

11. The panel apparatus of claim 9 wherein the transparent display device includes organic light emitting diode (OLED) device.

12. The panel apparatus of claim 9 wherein the reverse mode liquid crystal microdroplet display includes a color filter.

13. The panel apparatus of claim 9 wherein the reverse mode liquid crystal microdroplet display includes a dichroic dye.

14. A display system comprising:
    a first layer having opposite first and second sides;
    a second layer coupled to the first side of the first layer, the second layer including a reflective layer; and
    a projector providing images from the second side of the first layer;
    wherein the reflective layer includes a plurality of metallic particles suspended in a polymer medium.

* * * * *